United States Patent
AlBahrani et al.

(10) Patent No.: US 11,091,682 B2
(45) Date of Patent: Aug. 17, 2021

(54) METHODS OF USING DRILLING FLUID COMPOSITIONS WITH ENHANCED RHEOLOGY

(71) Applicant: Saudi Arabian Oil Company, Dhahran (SA)

(72) Inventors: Hussain AlBahrani, Qatif (SA); Abdullah Al-Yami, Dhahran (SA); Ali Safran, Dhahran (SA); Abdulaziz Alhelal, Alhsa-hofuf (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/735,073

(22) Filed: Jan. 6, 2020

(65) Prior Publication Data

US 2020/0140739 A1 May 7, 2020

Related U.S. Application Data

(60) Continuation of application No. 16/037,493, filed on Jul. 17, 2018, now Pat. No. 10,563,110, which is a
(Continued)

(51) Int. Cl.
| | | |
|---|---|---|
| C09K 8/24 | (2006.01) | |
| B01F 17/00 | (2006.01) | |
| C04B 7/52 | (2006.01) | |
| C09K 8/03 | (2006.01) | |
| C10M 107/34 | (2006.01) | |
| E21B 21/00 | (2006.01) | |
| E21B 33/14 | (2006.01) | |
| C10M 105/18 | (2006.01) | |
| C09K 8/22 | (2006.01) | |
| C09K 8/467 | (2006.01) | |
| C10M 173/00 | (2006.01) | |

(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 8/03* (2013.01); *C09K 8/28* (2013.01); *C09K 8/514* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2020/017* (2020.05); *C10N 2020/02* (2013.01); *C10N 2020/04* (2013.01); *C10N 2030/06* (2013.01); *C10N 2040/22* (2013.01); *C10N 2040/40* (2020.05); *C10N 2050/013* (2020.05); *Y02W 30/91* (2015.05)

(58) Field of Classification Search
None
See application file for complete search history.

(56) References Cited

U.S. PATENT DOCUMENTS

| | | | |
|---|---|---|---|
| 2,589,949 A | 3/1952 | Meadors | |
| 2,782,163 A | 2/1957 | Wilson | |

(Continued)

OTHER PUBLICATIONS

Notice of Allowance dated Jun. 29, 2020 pertaining to U.S. Appl. No. 15/581,136, filed Apr. 28, 2017, 15 pgs.

(Continued)

*Primary Examiner* — Jeffrey D Washville
(74) *Attorney, Agent, or Firm* — Dinsmore & Shohl LLP

(57) ABSTRACT

Drilling fluid compositions include a base fluid, at least one additive chosen from an emulsifier, weighting material, fluid-loss additive, viscosifier, or alkali compound, and from 0.1 wt. % to 1 wt. %, based on total weight of the drilling fluid composition, of an ethoxylated alcohol compound having the formula R—(OCH$_2$CH$_2$)$_7$—OH, in which R is a saturated or unsaturated, linear or branched hydrocarbyl group having from 8 to 20 carbon atoms. The base fluid may be an aqueous base fluid. Methods for drilling a subterranean well include operating a drill in a wellbore in the presence of a drilling fluid composition including the base fluid, the additive, and the ethoxylated alcohol compound.

13 Claims, No Drawings

Related U.S. Application Data division of application No. 15/485,724, filed on Apr. 12, 2017, now Pat. No. 10,351,750.

(60) Provisional application No. 62/454,189, filed on Feb. 3, 2017, provisional application No. 62/454,192, filed on Feb. 3, 2017.

(51) Int. Cl.

| | |
|---|---|
| *C04B 24/02* | (2006.01) |
| *C04B 28/02* | (2006.01) |
| *C04B 28/04* | (2006.01) |
| *C04B 28/08* | (2006.01) |
| *C09K 8/74* | (2006.01) |
| *E21B 43/25* | (2006.01) |
| *C09K 8/20* | (2006.01) |
| *C09K 8/40* | (2006.01) |
| *C09K 8/035* | (2006.01) |
| *C09K 8/08* | (2006.01) |
| *C09K 8/42* | (2006.01) |
| *C09K 8/48* | (2006.01) |
| *C04B 24/08* | (2006.01) |
| *C09K 8/487* | (2006.01) |
| *C09K 8/46* | (2006.01) |
| *C09K 8/04* | (2006.01) |
| *C04B 14/06* | (2006.01) |
| *C04B 38/02* | (2006.01) |
| *C10M 105/62* | (2006.01) |
| *C10M 111/04* | (2006.01) |
| *C09K 8/32* | (2006.01) |
| *C09K 8/36* | (2006.01) |
| *C10M 173/02* | (2006.01) |
| *C10N 20/02* | (2006.01) |
| *C10N 20/04* | (2006.01) |
| *C10N 20/00* | (2006.01) |
| *C10N 30/06* | (2006.01) |
| *C10N 40/22* | (2006.01) |
| *C10N 50/00* | (2006.01) |
| *C10N 40/00* | (2006.01) |
| *C09K 8/514* | (2006.01) |
| *C09K 8/28* | (2006.01) |
| *C04B 103/40* | (2006.01) |
| *C04B 103/46* | (2006.01) |
| *C04B 111/00* | (2006.01) |

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin |
| 3,048,538 A | 8/1962 | Rosenberg et al. |
| 3,319,714 A | 5/1967 | Knox |
| 3,353,603 A | 11/1967 | Knight |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel et al. |
| 5,474,701 A | 12/1995 | Jaquess et al. |
| RE35,163 E | 2/1996 | Christensen et al. |
| 5,586,608 A | 12/1996 | Clark et al. |
| 5,593,953 A | 1/1997 | Malchow |
| 5,593,954 A | 1/1997 | Malchow |
| 5,602,082 A | 2/1997 | Hale et al. |
| 5,618,780 A | 4/1997 | Argillier et al. |
| 5,683,973 A | 11/1997 | Post et al. |
| 5,728,210 A | 3/1998 | Moran et al. |
| 5,744,432 A | 4/1998 | Barnhorst et al. |
| 5,830,831 A | 11/1998 | Chan et al. |
| 5,850,880 A | 12/1998 | Moran et al. |
| 5,996,693 A | 12/1999 | Heathman |
| 6,063,737 A | 5/2000 | Haberman et al. |
| 6,258,756 B1 | 7/2001 | Hayatdavoudi |
| 6,267,716 B1 | 7/2001 | Quintero |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 9,249,052 B2 | 2/2016 | Kawakami |
| 10,287,476 B2 | 5/2019 | Al-Yami et al. |
| 10,287,477 B2 | 5/2019 | Al-Yami et al. |
| 10,494,559 B2 | 12/2019 | Al-Yami et al. |
| 10,526,520 B2 | 1/2020 | Al-Yami et al. |
| 10,538,692 B2 | 1/2020 | Al-Yami et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0116304 A1 | 6/2004 | Wu et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |
| 2007/0191235 A1 | 8/2007 | Mas et al. |
| 2008/0006404 A1 | 1/2008 | Reddy et al. |
| 2008/0171671 A1 | 7/2008 | Mueller et al. |
| 2008/0194432 A1 | 8/2008 | Heidlas et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0131285 A1 | 5/2009 | Wang et al. |
| 2009/0200033 A1 | 8/2009 | Kakadjian et al. |

(56) References Cited

U.S. PATENT DOCUMENTS

| | | |
|---|---|---|
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0173804 A1 | 7/2010 | Van de Peer et al. |
| 2010/0263863 A1 | 10/2010 | Quintero et al. |
| 2010/0319915 A1 | 12/2010 | Bustos et al. |
| 2010/0326660 A1 | 12/2010 | Ballard et al. |
| 2011/0303414 A1 | 12/2011 | Seth et al. |
| 2011/0306524 A1 | 12/2011 | Smith |
| 2012/0000708 A1 | 1/2012 | van Zanten et al. |
| 2012/0018226 A1 | 1/2012 | Nzeadibe et al. |
| 2012/0241155 A1 | 9/2012 | Ali et al. |
| 2012/0329683 A1 | 12/2012 | Droger et al. |
| 2013/0079256 A1 | 3/2013 | Yang et al. |
| 2013/0092376 A1 | 4/2013 | Ai-Subhi et al. |
| 2013/0126243 A1 | 5/2013 | Smith |
| 2013/0153232 A1 | 6/2013 | Bobier et al. |
| 2013/0190543 A1 | 7/2013 | Barnes et al. |
| 2013/0244913 A1 | 9/2013 | Maberry et al. |
| 2013/0303410 A1 | 11/2013 | Wagle et al. |
| 2013/0303411 A1 | 11/2013 | Wagle et al. |
| 2014/0024560 A1* | 1/2014 | Gonzalez Poche ...... C09K 8/12 507/111 |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |
| 2014/0213489 A1 | 7/2014 | Smith |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1 | 3/2015 | Hatchman et al. |
| 2015/0087563 A1 | 3/2015 | Brege et al. |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0090523 A1 | 3/2016 | Ravi et al. |
| 2016/0177169 A1 | 6/2016 | Zhang |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |
| 2018/0265763 A1 | 9/2018 | Leotaud et al. |

OTHER PUBLICATIONS

Notice of Allowance dated Jul. 22, 2020 pertaining to U.S. Appl. No. 15/586,543, filed May 4, 2017, 6 pgs.
Office Action dated Jul. 13, 2020 pertaining to U.S. Appl. No. 16/653,357, filed Oct. 15, 2019, 57 pgs.
Notice of Allowance dated Jul. 29, 2020 pertaining to U.S. Appl. No. 16/696,166, filed Nov. 26, 2019, 11 pgs.
Notice of Allowance and Fee(s) due dated Mar. 3, 2020 pertaining to U.S. Appl. No. 16/039,525, filed Jul. 19, 2018, 23 pgs.
Office Action dated Mar. 18, 2020 pertaining to U.S. Appl. No. 15/581,136, filed Apr. 28, 2017, 29 pgs.
Notice of Allowance and Fee(s) due dated Mar. 26, 2020 pertaining to U.S. Appl. No. 15/612,397, filed Jun. 2, 2017, 26 pgs.
Office Action dated Mar. 30, 2020 pertaining to U.S. Appl. No. 16/696,166, filed Nov. 26, 2019, 56 pgs.
Office Action dated Apr. 14, 2020 pertaining to U.S. Appl. No. 15/496,794, filed Apr. 25, 2017, 47 pgs.
Office Action dated Apr. 22, 2020 pertaining to U.S. Appl. No. 15/586,543, filed May 4, 2017, 33 pgs.
U.S. Notice of Allowance and Fee(s) Due dated Aug. 21, 2020 pertaining to U.S. Appl. No. 16/381,788, filed Apr. 11, 2019, 99 pgs.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
U.S. Office Action dated Apr. 11, 2019 pertaining to U.S. Appl. No. 15/628,892, filed Jun. 21, 2017, 34 pgs.
U.S. Notice of Allowance dated Apr. 24, 2019 pertaining to U.S. Appl. No. 15/485,724, filed Apr. 12, 2017, 23 pgs.
U.S. Notice of Allowance dated Apr. 26, 2019 pertaining to U.S. Appl. No. 15/489,930, filed Apr. 18, 2017, 14 pgs.
Notice of Allowance and Fee(s) Due dated May 15, 2019 pertaining to U.S. Appl. No. 15/922,077, filed Mar. 15, 2018, 27 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
U.S. Office Action dated Jul. 3, 2019 pertaining to U.S. Appl. No. 15/496,794, filed Apr. 25, 2017, 52 pgs.
U.S. Office Action dated Jul. 2, 2019 pertaining to U.S. Appl. No. 15/586,555, filed May 4, 2017, 92 pgs.
Tridecyl Alcohol Ethoxylate, 2016, retrieved Jun. 28, 2019 from http://webcache.goggleusercontent.com/search?q=cache:OiTX5lz527kJ:https://emochemicals.com/Ethoxylates/Ethoxylates/TRIDECYL-ALCOHOL-ETHOXYLATE&hl=en&gl=us&strip=1&vwsrc=0 (Year: 2016).
U.S. Office Action dated Jul. 2, 2019 pertaining to U.S. Appl. No. 16/039,525, filed Jul. 19, 2018, 75 pgs.
Notice of Allowance and Fee(s) Due dated Aug. 21, 2019 pertaining to U.S. Appl. No. 15/920,879, filed Mar. 14, 2018, 13 pgs.
Notice of Allowance and Fee(s) Due dated Aug. 28, 2019 pertaining to U.S. Appl. No. 16/451,167, filed Jun. 25, 2019, 43 pgs.
Examination Report for Application No. GC2018-34707 dated Jul. 21, 2019.
Examination Report for Application No. GC2018-34710 dated Jul. 22, 2019.
Examination Report for Application No. GC2018-34701 dated Jul. 29, 2019.
Examination Report for Application No. 3,052,276 dated Sep. 5, 2019.
Examination Report for Application No. GC2018-34699 dated Aug. 21, 2019.
Examination Report for Application No. GC2018/34711 dated Jul. 28, 2019.
Notice of Allowance and Fee(s) Due dated Oct. 11, 2019 pertaining to U.S. Appl. No. 16/037,493, filed Jul. 17, 2018, 17 pgs.
Notice of Allowance and Fee(s) Due dated Oct. 2, 2019 pertaining to U.S. Appl. No. 15/489,854, filed Apr. 18, 2017, 13 pgs.
Examination Report for Application No. GC2018-34700 dated Aug. 21, 2019.
Notice of Allowance and Fee(s) Due dated Nov. 5, 2019 pertaining to U.S. Appl. No. 15/586,555, filed May 4, 2017, 29 pgs.
Office Action dated Oct. 23, 2019 pertaining to U.S. Appl. No. 15/660,118, filed Jul. 26, 2017, 45 pgs.
Office Action dated Oct. 24, 2019 pertaining to U.S. App. No. 16/202,600, filed Nov. 28, 2018, 84 pgs.
Office Action dated Oct. 22, 2019 pertaining to U.S. Appl. No. 16/039,525, filed Jul. 19, 2018, 32 pgs.
Nelson, E.B. Well cementing, vol. 28, pp. 5-25 through 5-34, ISBN 0-444-88751-2 (Year: 1990).

(56) References Cited

OTHER PUBLICATIONS

Office Action dated Dec. 5, 2019 pertaining to U.S. Appl. No. 15/496,794, filed Apr. 25, 2017, 34 pgs.
Office Action dated Dec. 13, 2019 pertaining to U.S. Appl. No. 15/586,543, filed May 4, 2017, 27 pgs.
Office Action dated Dec. 19, 2019 pertaining to U.S. Appl. No. 15/612,397, filed Jun. 2, 2017, 34 pgs.
Office Action dated Dec. 13, 2019 pertaining to U.S. Appl. No. 15/581,136, filed Apr. 28, 2017, 33 pgs.
Notice of Allowance and Fee(s) Due dated Jan. 17, 2020 pertaining to U.S. Appl. No. 15/660,118, filed Jul. 26, 2017, 10 pgs.
Notice of Allowance and Fee(s) Due dated Jan. 9, 2020 pertaining to U.S. Appl. No. 16/002,669, filed Jun. 7, 2018, 35 pgs.
Examination Report for Application No. GC2018-34705 dated Oct. 27, 2019.
Office Action pertaining to European Patent Application No. 18713071.1 dated Sep. 16, 2020.
Office Action pertaining to European Patent Application No. 18704814.5 dated Sep. 11, 2020.
Gokavarapu et al., "An Experimental Study of Aphron Based Drilling Fluids", 5th Saint Petersburg International Conference & Exhibition—Geosciences: Making the Most of the Earth's resources, Apr. 2-5, 2012.
Notice of Allowance and Fee(s) Due dated Feb. 16, 2021 pertaining to U.S. Appl. No. 16/381,783, filed Apr. 11, 2019, 31 pgs.
Notice of Allowance and Fee(s) due dated Jan. 25, 2021 pertaining to U.S. Appl. No. 16/298,243, filed Mar. 11, 2019, 23 pgs.
Notice of Allowance and Fee(s) due dated Jan. 26, 2021 pertaining to U.S. Appl. No. 16/298,211, filed Mar. 11, 2019, 23 pgs.
Office Action pertaining to European Patent Application No. 18704368.2 dated Sep. 17, 2020.
Chinese Office Action dated Dec. 7, 2020 pertaining to application No. 201880009774.7 filed Jan. 25, 2018.
Chinese Office Action dated Dec. 21, 2020 pertaining to application No. 201880009610.4 filed Feb. 1, 2018.
Datasheet of Barite by AMC Drilling Fluids and Products (Year: 2011).
Office Action dated Nov. 10, 2020 pertaining to U.S. Appl. No. 16/438,985, filed Jun. 12, 2019, 61 pgs.
Office Action dated Nov. 10, 2020 pertaining to U.S. Appl. No. 16/439,006, filed Jun. 12, 2019, 61 pgs.
Notice of Allowance and Fee(s) Due dated Nov. 16, 2020 pertaining to U.S. Appl. No. 16/653,357, filed Oct. 15, 2019, 19 pgs.
Office Action dated Nov. 23, 2020 pertaining to European Patent Application No. 19191792.1 filed Jan. 25, 2018.
Office Action dated Sep. 24, 2020 pertaining to U.S. Appl. No. 16/381,783, filed Apr. 11, 2019, 100 pgs.
Office Action dated Sep. 30, 2020 pertaining to U.S. Appl. No. 16/774,410, filed Jan. 28, 2020, 63 pgs.
Office Action dated Oct. 8, 2020 pertaining to U.S. Appl. No. 16/298,243, filed Mar. 11, 2019, 106 pgs.
Office Action dated Oct. 5, 2020 pertaining to U.S. Appl. No. 16/856,288, filed Apr. 23, 2020, 49 pgs.
Office Action dated Oct. 8, 2020 pertaining to U.S. Appl. No. 16/298,211, filed Mar. 11, 2019, 91 pgs.
Examination Report for Application No. GC2018-34700 dated Dec. 18, 2019.
Examination Report for Application No. GC2018-34699 dated Dec. 31, 2019.
Examination Report for Application No. GC2018-34697 dated Dec. 26, 2019.
Notice of Allowance and Fee(s) Due dated Mar. 5, 2020 pertaining to U.S. Appl. No. 16/002,669, filed Jun. 7, 2018, 12 pgs.
Office Action dated Feb. 27, 2020 pertaining to U.S. Appl. No. 16/202,600, filed Nov. 28, 2018, 22 pgs.

* cited by examiner

METHODS OF USING DRILLING FLUID COMPOSITIONS WITH ENHANCED RHEOLOGY

CROSS-REFERENCE TO RELATED APPLICATIONS

This application is a continuation application of U.S. patent application Ser. No. 16/037,493 filed Jul. 17, 2018, which claims priority to U.S. patent application Ser. No. 15/485,724, filed Apr. 12, 2017, which claims the benefit of priority to U.S. Provisional Patent Application Ser. No. 62/454,189, filed Feb. 3, 2017 (SA 6100 MA), and to U.S. Provisional Patent Application Ser. No. 62/454,192 filed Feb. 3, 2017 (SA 6101 MA), which are incorporated by reference in this disclosure in their entirety.

TECHNICAL FIELD

Embodiments of the present disclosure generally relate to drilling fluid compositions for drilling oil wells and to methods of drilling subterranean wells using the drilling fluid compositions. In particular, the present disclosure relates to drilling fluid compositions having rheology enhancing compounds and to methods of drilling subterranean wells using the drilling fluid compositions.

BACKGROUND

During drilling operations, a drilling fluid, which may also be referred to as drilling mud, is circulated through the wellbore to cool the drill bit, to convey rock cuttings to the surface, or to support the wellbore against collapse of the wellbore and against intrusion of fluids from the formation, among other purposes. Drilling fluids are formulated to have certain fluid characteristics, such as density and rheology, for example, that allow the drilling fluid to perform these functions. However, under certain extreme downhole conditions, such as excessive temperature, for example, some of the properties of the drilling fluid may be altered. For example, the drilling fluid may thicken, increase in viscosity, or form a gel. These changes in properties of the drilling fluid can lead to problems such as solids settling, stuck pipes, and excessive pump pressure.

Drillers counteract these issues by adding thinners, which are sometimes referred to as mud thinners, to the drilling fluid. Some of the more common drilling fluid thinners include plant tannins, such as quebracho, lignosulfonic acid and its salts (e.g., chromium, iron, cobalt, sodium, and aluminum salts or any mixture of these salts), lignitic materials, and polyphosphates. Certain synthetic polymers have also been used as thinners for drilling fluids. However, there is an ongoing need for drilling fluid thinners and/or additives that are capable of withstanding extreme downhole conditions.

SUMMARY

Embodiments of the present disclosure are directed to drilling fluid compositions comprising an ethoxylated alcohol compound and to methods for drilling a subterranean well using the drilling fluid compositions having the ethoxylated alcohol compound.

According to one or more embodiments, a drilling fluid composition includes a base fluid, at least one additive chosen from an emulsifier, a weighting material, a fluid-loss additive, a viscosifier, or an alkali compound, and from 0.1 weight percent (wt. %) to 1 wt. %, based on the total weight of the drilling fluid composition, of an ethoxylated alcohol compound having formula (I):

$$R-(OCH_2CH_2)_7-OH \qquad (I)$$

where R is a hydrocarbyl group having from 8 to 20 carbon atoms.

In some embodiments, the drilling fluid compositions may have yield points from 45 pounds of force per 100 square feet (lbf/100 ft$^2$) (21.6 pascals (Pa)) to 100 lbf/100 ft$^2$ (48 Pa) and a 10-second gel strength of from 1 lbf/100 ft$^2$ (0.5 Pa) to 30 lbf/100 ft$^2$ (14.4 Pa) as determined according to test methods provided in API RP 13B-1. In example drilling fluid compositions, the base fluid is an aqueous base fluid. In other example drilling fluid compositions, the base fluid is an aqueous base fluid that comprises at least 50 weight percent water based on the total weight of the aqueous base fluid. The aqueous base is chosen from fresh water, filtered water, distilled water, sea water, salt water, produced water, formation brine, or combinations thereof.

In some example drilling fluids, R is a saturated linear hydrocarbyl group. In other example drilling fluid compositions, R is —(CH$_2$)$_m$CH$_3$, where m is 11, 12, or 13. In other example drilling fluid compositions, R has exactly 12 carbon atoms. The drilling fluid composition may have a density of equal to or greater than 70 pounds of mass per cubic foot (lbm/ft$^3$).

In some example drilling fluid compositions, the at least one additive comprises a weighting material. The weighting material is chosen from at least one of barite, calcium carbonate, hematite, siderite, or ilmenite.

In some examples, the drilling fluid composition includes from 20 wt. % to 50 wt. % base fluid, based on the total weight of the drilling fluid composition. The drilling fluid may include from 1 wt. % to 73 wt. % weighting material based on the total weight of the drilling fluid composition. The drilling fluid composition may optionally include from 0.01 wt. % to 0.7 wt. % xanthan gum polymer based on the total weight of the drilling fluid composition. The drilling fluid composition may optionally include from 0.01 wt. % to 0.7 wt. % soda ash based on the total weight of the drilling fluid composition. The drilling fluid composition may optionally include from 0.01 wt. % to 3 wt. % sodium sulfite based on the total weight of the drilling fluid composition. The drilling fluid composition may optionally include from 0.1 wt. % to 1 wt. % starch based on the total weight of the drilling fluid composition.

According to one or more other embodiments, a method of drilling a subterranean well includes operating a drill in a wellbore in the presence of a drilling fluid composition comprising a base fluid, at least one additive chosen from an emulsifier, a weighting material, a fluid-loss additive, a viscosifier, or an alkali compound, and from 0.1 wt. % to 1 wt. %, based on the total weight of the drilling fluid composition, of an ethoxylated alcohol compound having formula (I):

$$R-(OCH_2CH_2)_7-OH \qquad (I)$$

where R is a hydrocarbyl group having from 8 to 20 carbon atoms. In some embodiments, the drilling fluid composition has a yield point of from 45 lbf/100 ft$^2$ (21.6 Pa) to 100 lbf/100 ft$^2$ (48 Pa) and a 10-second gel strength of from 1 lbf/100 ft$^2$ (0.5 Pa) to 30 lbf/100 ft$^2$ (14.4 Pa) as determined according to test methods provided in API RP 13B-1 (American Petroleum Institute Recommended Procedure 13B-1). The base fluid may be an aqueous base fluid. In some example methods, the base fluid is an aqueous base fluid comprising at least 50 weight percent water based on the total weight of the aqueous base fluid. In example methods, the drilling fluid composition further comprises one or more of a xanthan gum polymer, soda ash, sodium sulfite, or starch.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

To drill a subterranean well or wellbore, a drill string including a drill bit and drill collars to weight the drill bit is inserted into a predrilled hole and rotated to cause the drill bit to cut into the rock at the bottom of the hole, producing rock cuttings. To remove the rock cuttings from the bottom of the wellbore, a drilling fluid is pumped down through the drill string to the drill bit. The drilling fluid cools the drill bit and lifts the rock cuttings away from the drill bit. The drilling fluid carries the rock cuttings upwards as the drilling fluid is recirculated back to the surface. At the surface, the rock cuttings are removed from the drilling fluid, and the drilling fluid is then recirculated back down the drill string to the bottom of the wellbore. The term "rock cuttings" is intended to include any fragments, pieces, or particulates separated from the formation by the drill bit or otherwise present in the wellbore.

Under certain extreme downhole conditions, such as excessive temperature or difficult formations, some of the properties of conventional drilling fluids may be altered. For example, interaction of the drilling fluid with a formation having swelling clay and/or excessive solids content or subjecting the drilling fluid to extreme downhole temperatures may cause the conventional drilling fluid to thicken, excessively increase in viscosity, undergo gelation, or any combination of these. In some drilling scenarios, conventional drilling fluids having an increased density and, therefore, increased solids content may enable drilling of a pressurized formation or may be used to control and kill a flowing downhole formation. The increased concentration of solids and increased density of the conventional drilling fluids used in these applications increase the ability of the drilling fluids to support the wellbore and provide enhanced hydrostatic pressure to prevent fluids in the formation from flowing into the wellbore. However, in these challenging scenarios, the increased density and increased solid content of the conventional drilling fluids can lead to problems such as solids settling, stuck pipes, and excessive pump pressure.

The drilling fluid compositions described in this disclosure serve several functions in the drilling process. The drilling fluid compositions provide lubrication and cooling to the drill bit. According to embodiments, the drilling fluid compositions also aid with cleaning the wellbore by transporting rock cuttings from the drill bit to the surface. Additionally, in embodiments, the drilling fluid compositions provide hydrostatic pressure in the wellbore to provide support to the sidewalls of the wellbore and prevent the sidewalls from collapsing and caving-in on the drill string. In embodiments, the drilling fluid compositions provide hydrostatic pressure in the wellbore to prevent fluids in the downhole formations from flowing into the wellbore during drilling operations.

Embodiments of the present disclosure are directed to drilling fluid compositions having a rheology enhancing compound. The rheology enhancing compound is an ethoxylated alcohol compound having the chemical formula R—(OCH$_2$CH$_2$)$_7$—OH, where R is a saturated or unsaturated, linear or branched hydrocarbyl group having from 8 to 20 carbon atoms. An example drilling fluid composition incorporating the ethoxylated alcohol compound includes a base fluid, one or more additives including emulsifiers, weighting material, fluid-loss additives, viscosifiers, or alkali compounds, and from 0.1 weight percent (wt. %) to 1 wt. %, based on the total weight of the drilling fluid composition, of the ethoxylated alcohol compound having formula (I):

$$R\text{—}(OCH_2CH_2)_7\text{—}OH \tag{I}$$

where R is a saturated or unsaturated, linear or branched hydrocarbyl group having from 8 to 20 carbon atoms. In some embodiments, the drilling fluid composition with the ethoxylated alcohol compound may have a yield point of from 45 pounds of force per 100 square feet (lbf/100 ft$^2$) (21.6 Pa) to 100 lbf/100 ft$^2$ (48 Pa) and a 10-second gel strength of from 1 lbf/100 ft$^2$ (0.5 Pa) to 30 lbf/100 ft$^2$ (14.4 Pa), where 1 lbf/100 ft$^2$ is approximately 0.48 Pascal (Pa).

Without intent to be bound by theory, it is believed that the presence of the ethoxylated alcohol compound in the drilling fluid composition modifies the rheology of the drilling fluid composition by creating a thinning effect in the drilling fluid composition while maintaining the hole-cleaning abilities of the drilling fluid composition. The thinning effect is believed to reduce the gel strength of the drilling fluid composition, so as to improve pump-ability and prevent stuck-pipe problems. However, the yield point and the density of the drilling fluid composition having the ethoxylated alcohol compound are maintained compared to a comparative drilling fluid composition in which an equivalent weight of water is substituted in place of the ethoxylated alcohol compound. Yield point and density are related to the ability of a drilling fluid composition to convey rock cuttings to the surface (hole-cleaning ability). Maintenance of the yield point and density of the drilling fluid composition having the ethoxylated alcohol compound preserves this ability of the drilling fluid composition to convey rock cuttings to the surface.

The drilling fluid compositions having the ethoxylated alcohol compounds have specific properties and characteristics, including density, viscosity, solids content, pump-ability, and hole-cleaning capability, that improve handling of the drilling fluid compositions during drilling operations and preserve the ability of the drilling fluid compositions to convey the rock cuttings from the bottom of the wellbore to the surface. In particular, the drilling fluid compositions having the ethoxylated alcohol compound exhibit specific rheological properties that enable the drilling fluid composition to be pumped down through the drill string while also enabling the drilling fluid compositions to convey the rock cuttings from drill bit to the top of the wellbore. The rheological properties of the drilling fluid compositions having the ethoxylated alcohol compound may reduce or eliminate drilling problems such as solids settling, stuck pipes, and excessive pump pressure. Additionally, the drilling fluid compositions having the ethoxylated alcohol compounds have sufficient density to provide the hydrostatic pressure necessary to support the sidewalls of the wellbore and prevent fluids in the formation from flowing into the wellbore.

The drilling fluid compositions according to embodiments may include weighting material added to a base fluid, such as water or oil for example, and the ethoxylated alcohol compound. Other additives may be added to the drilling fluid composition to influence or modify the density, rheology, or other properties of the drilling fluid. The ethoxylated alcohol compound may be a reaction product of a fatty alcohol ethoxylated with ethylene oxide at a 7:1 molar ratio of the fatty alcohol to the ethylene oxide. Ethylene oxide is a cyclic ether having the chemical formula $C_2H_4O$ and may be produced through oxidation of ethylene in the presence of a silver catalyst.

The fatty alcohols used as the reactant to make the ethoxylated alcohol compound include alcohols having formula R—OH, in which R is a saturated or unsaturated, linear, or branched hydrocarbyl group having from 8 to 20 carbon atoms, such as from 8 to 18 carbon atoms, from 8 to 16 carbon atoms, from 8 to 14 carbon atoms, from 8 to 12 carbon atoms, from 8 to 10 carbon atoms, from 10 to 20 carbon atoms, from 10 to 18 carbon atoms, from 10 to 16 carbon atoms, from 10 to 14 carbon atoms, from 10 to 12 carbon atoms, from 12 to 20 carbon atoms, from 12 to 18 carbon atoms, from 12 to 16 carbon atoms, from 12 to 14 carbon atoms, from 14 to 20 carbon atoms, from 14 to 18 carbon atoms, from 14 to 16 carbon atoms, from 16 to 20 carbon atoms, or 12 carbon atoms. As used in this disclosure, a "hydrocarbyl group" refers to a hydrocarbon radical formed by removing one hydrogen atom from a hydrocarbon compound consisting of carbon atoms and hydrogen atoms. The hydrocarbyl group forms a chemical bond with another chemical group at the carbon atom of the hydrocarbyl group from which the hydrogen atom was removed. In one or more embodiments, R of the fatty alcohol may be a saturated linear hydrocarbyl group. Alternatively, R of the fatty alcohol may be a branched hydrocarbyl group.

The fatty alcohol having formula R—OH may be a naturally derived fatty alcohol or a synthetically derived fatty alcohol. The fatty alcohol may be a naturally-occurring fatty alcohol, such as a fatty alcohol obtained from natural sources such as animal fats or vegetable oils. The fatty alcohol may also be a hydrogenated naturally-occurring unsaturated fatty alcohol. Alternatively, the fatty alcohol may be a synthetic fatty alcohol prepared from a petroleum source or other source through one or more synthesis reactions. Non-limiting examples of fatty alcohols may include, but are not limited to capryl alcohol, perlargonic alcohol, decanol (decyl alcohol), undecanol, dodecanol (lauryl alcohol), tridecanol (tridecyl alcohol), myristyl alcohol (1-tetradecanol), pentadecanol (pentadecyl alcohol), cetyl alcohol, palmitoeyl alcohol (cis-9-hexadecenol), heptadecanol (heptadecyl alcohol), stearyl alcohol, nonadecyl alcohol, arachidyl alcohol, alcohol ethoxylates, other naturally-occurring fatty alcohols, other synthetic fatty alcohols, or combinations of any of these fatty alcohols. In examples, the fatty alcohol may be produced through oligomerization of ethylene derived from a petroleum source, or in other examples, the fatty alcohol may be produced through hydroformylation of alkenes followed by hydrogenation of the hydroformylation reaction product. In one or more embodiments, the fatty alcohol may include a hydrocarbon chain (R) having from 12 to 14 carbon atoms. Some example ethoxylated alcohol compounds may be made using a saturated linear fatty alcohol having a saturated linear hydrocarbyl group R with 12 carbon atoms.

The ethoxylated alcohol compound may be made by reacting the fatty alcohol with ethylene oxide at a 7:1 molar ratio of the fatty alcohol to the ethylene oxide. The ethoxylation reaction may be conducted at an elevated temperature and in the presence of an anionic catalyst, such as potassium hydroxide (KOH) for example. The ethoxylation reaction proceeds according to the following Equation 1.

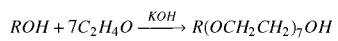

$$ROH + 7C_2H_4O \xrightarrow{KOH} R(OCH_2CH_2)_7OH \quad \text{Equation 1}$$

In Equation 1, R is the hydrocarbon portion of the fatty alcohol previously described in this disclosure. As shown in Equation 1, the reaction product may have the general chemical formula R—$(OCH_2CH_2)_7$—OH, where R is a saturated or unsaturated, linear or branched hydrocarbyl group having from 8 to 20 carbon atoms, such as from 8 to 18 carbon atoms, from 8 to 16 carbon atoms, from 8 to 14 carbon atoms, from 8 to 12 carbon atoms, from 8 to 10 carbon atoms, from 10 to 20 carbon atoms, from 20 to 18 carbon atoms, from 10 to 16 carbon atoms, from 10 to 14 carbon atoms, from 10 to 12 carbon atoms, from 12 to 20 carbon atoms, from 12 to 18 carbon atoms, from 12 to 16 carbon atoms, from 12 to 14 carbon atoms, from 14 to 20 carbon atoms, from 14 to 18 carbon atoms, from 14 to 16 carbon atoms, from 16 to 20 carbon atoms, or 13 carbon atoms. In embodiments, R is —$(CH_2)_m CH_3$ where m is from 7 to 19, from 9 to 15, or from 11 to 13. In some embodiments, m is 11, 12, or 13. In some embodiments, the ethoxylated alcohol compound produced from ethoxylation of the fatty alcohol with ethylene oxide at a 7:1 molar ratio of fatty alcohol to ethylene oxide has the chemical formula $CH_3(CH_2)_m$—$(OCH_2CH_2)_7$—OH; where m is an integer from 11 to 13. In some embodiments, m is 11. In some embodiments, the ethoxylated alcohol compound comprises, consists essentially of, or consists of a compound having the chemical formula $CH_3(CH_2)_{11}$—$(OCH_2CH_2)_7$—OH. In some embodiments, the fatty alcohol may be a fatty alcohol ethoxylate having formula R—$(OCH_2CH_2)_n$—OH, in which n is less than 7. In these embodiments, the fatty alcohol ethoxylate may be further ethoxylated with ethylene oxide to produce the ethoxylated alcohol compound having formula R—$(OCH_2CH_2)_7$—OH.

It should be understood that unreacted fatty alcohol, unreacted ethylene oxide, one or more other alcohol ethoxylates having the formula R—$(OCH_2CH_2)_n$—OH in which "n" is an integer greater than or less than 7, other byproducts, or combinations of these compounds may be present as impurities in the ethoxylated alcohol left over from its synthesis. Therefore, the drilling fluid composition may contain small amounts of unreacted fatty alcohols, unreacted ethylene oxide, one or more other alcohol ethoxylates having the formula R—$(OCH_2CH_2)_n$—OH in which "n" is an integer greater than or less than 7, other byproducts, or combinations of these compounds. As used in this disclosure, the term "small amount" refers to a quantity less than 2% by weight based on the total weight of a composition. For example, the ethoxylated alcohol compound may include from 0.001 wt. % to 2 wt. % unreacted fatty alcohols, unreacted ethylene oxide, one or more alcohol ethoxylates having the formula R—$(OCH_2CH_2)_n$—OH in which "n" is an integer greater than or less than 7, other byproducts, or combinations of these components, based on the total weight of the ethoxylated alcohol compound. The weight percent of the ethoxylated alcohol compound in the drilling fluid composition does not include the weight of impurities or byproducts, such as the unreacted fatty alcohols, unreacted ethylene oxide, one or more other alcohol ethoxylates having the formula R—$(OCH_2CH_2)_n$—OH in which "n" is an integer greater than or less than 7, other byproducts, or combinations of these components.

As previously discussed, the drilling fluid composition includes at least a base fluid, the ethoxylated alcohol compound, and one or more additives, any or all of which may change one or more characteristics of the drilling fluid composition. The base fluid may include water, oil (natural or synthetic), or a water/oil emulsion. For drilling fluid compositions that are water-based, the base fluid may be an aqueous base fluid. An aqueous base fluid may be any suitable fluid such as water or a solution containing both water and one or more organic or inorganic compounds dissolved in the water or otherwise completely miscible with the water. For example, in some embodiments, the aqueous base fluid may include at least 50 wt. % water. The aqueous base fluid may include one or more of fresh water, well water, filtered water, distilled water, sea water, salt water, produced water, formation brine, other type of water, or combinations of waters. Alternatively, the drilling fluid compositions may be oil-based and may have a base fluid that is a natural oil or synthetic oil. The base fluid of the drilling fluid composition may also be a water-in-oil emulsion or an invert emulsion. In water-in-oil emulsions and invert emulsions, oil is a continuous phase and water is dispersed in the continuous oil phase by emulsification so that the drilling fluid does not have a distinct water layer.

The drilling fluid composition may have an amount of the base fluid sufficient to enable the drilling fluid composition to be circulated to the drill bit at the bottom of a wellbore and back to the surface. The drilling fluid composition may include from 20 wt. % to 99 wt. % base fluid based on the total weight of the drilling fluid composition. For example, the drilling fluid composition may have from 20 wt. % to 80 wt. %, from 20 wt. % to 70 wt. %, from 20 wt. % to 60 wt. %, from 20 wt. % to 50 wt. %, from 20 wt. % to 40 wt. %, from 23 wt. % to 99 wt. %, from 23 wt. % to 80 wt. %, from 23 wt. % to 70 wt. %, from 23 wt. % to 60 wt. %, from 23 wt. % to 50 wt. %, from 23 wt. % to 40 wt. %, from 24 wt. % to 99 wt. %, from 24 wt. % to 80 wt. %, from 24 wt. % to 70 wt. %, from 24 wt. % to 60 wt. %, from 24 wt. % to 50 wt. %, from 24 wt. % to 40 wt. %, from 25 wt. % to 99 wt. %, from 25 wt. % to 80 wt. %, from 25 wt. % to 70 wt. %, from 25 wt. % to 60 wt. %, from 25 wt. % to 50 wt. %, or from 25 wt. % to 40 wt. % base fluid based on the total weight of the drilling fluid composition. Alternatively, the drilling fluid composition may include from 170 pounds of mass per barrel of oil (lbm/bbl) to 340 lbm/bbl base fluid based on the total volume of the drilling fluid composition. For example, in embodiments, the drilling fluid composition may have from 170 lbm/bbl to 330 lbm/bbl, from 170 lbm/bbl to 310 lbm/bbl, from 170 lbm/bbl to 280 lbm/bbl, from 170 lbm/bbl to 250 lbm/bbl, from 170 lbm.bbl to 220 lbm/bbl, from 170 lbm/bbl to 210 lbm/bbl, from 185 lbm/bbl to 340 lbm/bbl, from 185 lbm/bbl to 330 lbm/bbl, from 185 lbm/bbl to 310 lbm/bbl, from 185 lbm/bbl to 280 lbm/bbl, from 185 lbm/bbl to 250 lbm/bbl, from 185 lbm.bbl to 220 lbm/bbl, from 200 lbm/bbl to 340 lbm/bbl, from 200 lbm/bbl to 330 lbm/bbl, from 200 lbm/bbl to 310 lbm/bbl, from 200 lbm/bbl to 280 lbm/bbl, from 200 lbm/bbl to 250 lbm/bbl, from 210 lbm/bbl to 340 lbm/bbl, from 210 lbm/bbl to 330 lbm/bbl, from 210 lbm/bbl to 310 lbm/bbl, from 210 lbm/bbl to 280 lbm/bbl, from 210 lbm/bbl to 250 lbm/bbl, from 220 lbm.bbl to 340 lbm/bbl, from 220 lbm/bbl to 330 lbm/bbl, from 220 lbm/bbl to 310 lbm/bbl, from 220 lbm/bbl to 280 lbm/bbl, from 250 lbm/bbl to 340 lbm/bbl, or from 250 lbm/bbl to 310 lbm/bbl base fluid based on the total volume of the drilling fluid composition. In embodiments, the drilling fluid composition may have from 20 wt. % to 50 wt. % base fluid based on the total weight of the drilling fluid composition. In other embodiments, the drilling fluid composition may have from 25 wt. % to 50 wt. % base fluid based on the total weight of the drilling fluid composition.

In embodiments, the drilling fluid composition may include a weighting material. In some embodiments, the weighting material may be a particulate solid having a specific gravity (SG) sufficient to increase the density of the drilling fluid composition by a certain amount without adding so much weighting material that the drilling fluid composition cannot be circulated through the wellbore. The weighting material may have a specific gravity (SG) of from 2 grams per cubic centimeter (g/cm$^3$) to 6 g/cm$^3$. Examples of weighting materials include, but are not limited to, barite (minimum SG of 4.20 g/cm$^3$), hematite (minimum SG of 5.05 g/cm$^3$), calcium carbonate (minimum SG of 2.7-2.8 g/cm$^3$), siderite (minimum SG of 3.8 g/cm$^3$), ilmenite (minimum SG of 4.6 g/cm$^3$), other weighting materials, or any combination of these weighting materials. Some example drilling fluid compositions may include barite as the solid.

The drilling fluid composition may include a weight percent of weighting material sufficient to increase the density of the drilling fluid composition to allow the drilling fluid composition to support the wellbore and prevent fluids in downhole formations from flowing into the wellbore. In embodiments, the drilling fluid composition may include from 1 wt. % to 80 wt. % weighting material based on the total weight of the drilling fluid composition. In some embodiments, the drilling fluid composition may include from 1 wt. % to 75 wt. %, from 1 wt. % to 74 wt. %, from 1 wt. % to 73 wt. %, from 1 wt. % to 70 wt. %, from 1 wt. % to 60 wt. %, from 20 wt. % to 80 wt. %, from 20 wt. % to 75 wt. %, from 20 wt. % to 74 wt. %, from 20 wt. % to 73 wt. %, from 20 wt. % to 70 wt. %, from 20 wt. % to 60 wt. %, from 50 wt. % to 80 wt. %, from 50 wt. % to 75 wt. %, from 50 wt. % to 74 wt. %, from 50 wt. % to 73 wt. %, from 50 wt. % to 70 wt. %, from 50 wt. % to 60 wt. %, from 60 wt. % to 80 wt. %, or from 60 wt. % to 75 wt. % weighting material based on the total weight of the drilling fluid composition. In embodiments, the drilling fluid composition may include from 2 lbm/bbl to 750 lbm/bbl weighting material based on the total volume of the drilling fluid composition. In some embodiments, the drilling fluid composition may include from 2 lbm/bbl to 650 lbm/bbl, from 2 lbm/bbl to 550 lbm/bbl, from 2 lbm/bbl to 450 lbm/bbl, from 2 lbm/bbl to 300 lbm/bbl, from 50 lbm/bbl to 750 lbm/bbl, from 50 lbm/bbl to 650 lbm/bbl, from 50 lbm/bbl to 550 lbm/bbl, from 50 lbm/bbl to 450 lbm/bbl, from 50 lbm/bbl to 300 lbm/bbl, from 100 lbm/bbl to 750 lbm/bbl, from 100 lbm/bbl to 650 lbm/bbl, from 100 lbm/bbl to 550 lbm/bbl, from 100 lbm/bbl to 450 lbm/bbl, from 100 lbm/bbl to 300 lbm/bbl, from 300 lbm/bbl to 750 lbm/bbl, or from 300 lbm/bbl to 650 lbm/bbl weighting material, based on the total volume of the drilling fluid composition.

The drilling fluid composition may include at least one solid-phase component. Examples of solid-phase components in the drilling fluid compositions may include, but are not limited to, the weighting materials, starch, soda ash, bentonite, lime, sodium sulfite, other solid-phase component, or combinations of these solid-phase components. All of the solid-phase components together make up a total solids content of the drilling fluid composition. In some embodiments, the drilling fluid composition may have a total solids content of equal to or greater than 50 wt. % based on the total weight of the drilling fluid composition. Alternatively, in other embodiments, the drilling fluid composition may have a solids content of equal to or greater than 60 wt. % based on the total weight of the drilling fluid composition.

The drilling fluid compositions may have an amount of the ethoxylated alcohol compound sufficient to produce a thinning effect in the drilling fluid composition while maintaining the hole-cleaning ability of the drilling fluid composition. In particular, in embodiments, the drilling fluid composition may have an amount of the ethoxylated alcohol compound sufficient to reduce the gel strength of the drilling fluid composition while maintaining the yield point of the drilling fluid composition. In some embodiments, the drilling fluid composition may have an amount of the ethoxylated alcohol compound sufficient to reduce the 10-second gel strength into a range from 1 lbf/100 ft$^2$ (0.5 Pa) to 30 lbf/100 ft$^2$ (14.4 Pa) while maintaining the yield point of the drilling fluid composition in a range of from 45 lbf/100 ft$^2$ (21.6 Pa) to 100 lbf/100 ft$^2$ (14.4 Pa). In embodiments, the drilling fluid composition may include from 0.1 wt. % to 1 wt. % ethoxylated alcohol compound having formula (I), based on the total weight of the drilling fluid composition. In other embodiments, the drilling fluid composition may include from 0.1 wt. % to 0.8 wt. %, from 0.1 wt. % to 0.6 wt. %, from 0.1 wt. % to 0.5 wt. %, from 0.2 wt. % to 1 wt. %, from 0.2 wt. % to 0.8 wt. %, from 0.2 wt. % to 0.6 wt. %, from 0.2 wt. % to 0.5 wt. %, from 0.3 wt. % to 1 wt. %, from 0.3 wt. % to 0.8 wt. %, from 0.3 wt. % to 0.6 wt. %, or from 0.3 wt. % to 0.5 wt. % ethoxylated alcohol compound having chemical formula (I) based on the total weight of the drilling fluid. In embodiments, the drilling fluid composition may include from 1 lbm/bbl to 20 lbm/bbl ethoxylated alcohol compound having formula (I), based on the total volume of the drilling fluid composition. In embodiments, the drilling fluid composition may have from 1 lbm/bbl to 17 lbm/bbl, from 1 lbm/bbl to 14 lbm/bbl, from 1 lbm/bbl to 10 lbm/bbl, from 2 lbm/bbl to 20 lbm/bbl, from 2 lbm/bbl to 17 lbm/bbl, from 2 lbm/bbl to 14 lbm/bbl, from 2 lbm/bbl to 10 lbm/bbl, from 5 lbm/bbl to 20 lbm/bbl, from 5 lbm/bbl to 17 lbm/bbl, from 5 lbm/bbl to 14 lbm/bbl, from 5 lbm/bbl to 10 lbm/bbl, from 10 lbm/bbl to 20 lbm/bbl, from 10 lbm/bbl to 17 lbm/bbl, or from 10 lbm/bbl to 14 lbm/bbl ethoxylated alcohol compound having formula (I), based on the total volume of the drilling fluid composition.

The drilling fluid compositions may optionally include one or a plurality of additives to enhance the properties and characteristics of the drilling fluid composition. Examples of the additives include, but are not limited to, emulsifiers, fluid-loss control additives, viscosifiers (viscosity control agents), alkali compounds, or combinations of these. The drilling fluid composition may also optionally include pH buffers, electrolytes, glycols, glycerols, dispersion aids, corrosion inhibitors, defoamers, and other additives or combinations of additives. In embodiments, the drilling fluid composition may optionally include a viscosifier to impart non-Newtonian fluid rheology to the drilling fluid composition to facilitate lifting and conveying rock cuttings to the surface of the wellbore. Examples of viscosifiers may include, but are not limited to, a xanthan gum polymer such as XC polymer, bentonite, polyacrylamide, polyanionic cellulose, or combinations of these viscosifiers. In some embodiments, the drilling fluid composition may optionally include a xanthan gum polymer known as XC polymer, which is a polysaccharide secreted by the bacteria *Xanthomonas campestris* (XC). Drilling fluid compositions that include xanthan gum polymer may exhibit flat velocity profiles of the drilling fluid composition subjected to annular flow. The flat velocity profile resulting from the presence of the xanthan gum polymer in the drilling fluid composition may improve the efficiency of the drilling fluid composition in lifting and conveying rock cuttings to the surface. An example drilling fluid composition may optionally include from 0.01 wt. % to 0.7 wt. % xanthan gum polymer based on the total weight of the drilling fluid composition. In other embodiments, drilling fluid composition may optionally include from 0.01 wt. % to 0.5 wt. %, from 0.01 wt. % to 0.3 wt. %, from 0.01 wt. % to 0.1 wt. %, from 0.01 wt. % to 0.05 wt. %, from 0.05 wt. % to 0.7 wt. %, from 0.05 wt. % to 0.5 wt. %, from 0.05 wt. % to 0.3 wt. %, from 0.05 wt. % to 0.1 wt. %, from 0.1 wt. % to 0.7 wt. %, from 0.1 wt. % to 0.5 wt. %, from 0.1 wt. % to 0.3 wt. %, from 0.3 wt. % to 0.7 wt. %, from 0.3 wt. % to 0.5 wt. %, or from 0.5 wt. % to 0.7 wt. % xanthan gum polymer, based on the total weight of the drilling fluid composition. Unless otherwise stated, the weight percent of an additive in the drilling fluid composition is based on the total weight of the drilling fluid composition. An example drilling fluid composition may optionally include from 0.1 lbm/bbl to 25 lbm/bbl xanthan gum polymer based on the total volume of the drilling fluid composition. In other embodiments, the drilling fluid composition may optionally include from 0.1 lbm/bbl to 20 lbm/bbl, from 0.1 lbm/bbl to 15 lbm/bbl, from 0.1 lbm/bbl to 10 lbm/bbl, from 0.1 lbm/bbl to 5 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 10 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 10 lbm/bbl, from 10 lbm/bbl to 25 lbm/bbl, from 10 lbm/bbl to 20 lbm/bbl, from 10 lbm/bbl to 15 lbm/bbl, or from 15 lbm/bbl to 25 lbm/bbl xanthan gum polymer, based on the total volume of the drilling fluid composition. In some embodiments, the drilling fluid composition may optionally include from 0.01 wt. % to 3 wt. % bentonite, based on the total weight of the drilling fluid composition. In other embodiments, the drilling fluid composition may optionally include from 0.01 wt. % to 2 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 3 wt. %, from 0.05 wt. % to 2 wt. %, from 0.05 wt. % to 1 wt. %, from 0.05 wt. % to 0.5 wt. %, from 0.05 wt. % to 0.1 wt. %, from 0.1 wt. % to 3 wt. %, from 0.1 wt. % to 2 wt. %, from 0.1 wt. % to 1 wt. %, from 0.1 wt. % to 0.5 wt. %, from 0.5 wt. % to 3 wt. %, from 0.5 wt. % to 2 wt. %, from 0.5 wt. % to 1 wt. %, from 1 wt. % to 3 wt. %, from 1 wt. % to 2 wt. %, or from 2 wt. % to 3 wt. % bentonite, based on the total weight of the drilling fluid composition. In some embodiments, the drilling fluid composition may optionally include from 0.5 lbm/bbl to 25 lbm/bbl bentonite, based on the total volume of the drilling fluid composition. In other embodiments, the drilling fluid composition may optionally include from 0.5 lbm/bbl to 20 lbm/bbl, from 0.5 lbm/bbl to 15 lbm/bbl, from 0.5 lbm/bbl to 10 lbm/bbl, from 0.5 lbm/bbl to 5 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 10 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 10 lbm/bbl, from 10 lbm/bbl to 25 lbm/bbl, from 10 lbm/bbl to 20 lbm/bbl, from 10 lbm/bbl to 15 lbm/bbl, or from 15 lbm/bbl to 25 lbm/bbl bentonite, based on the total volume of the drilling fluid composition. The drilling fluid composition may optionally include other suitable viscosifiers without deviating from the scope of the present subject matter.

The drilling fluid composition may optionally include at least one pH adjuster. In embodiments, the drilling fluid composition may optionally include at least one alkali compound. Examples of alkali compounds may include, but are not limited to, lime (calcium hydroxide, calcium oxide, or a mixture of both), soda ash (sodium carbonate), sodium hydroxide, potassium hydroxide, other strong bases, or combinations of these alkali compounds. The alkali compounds may react with gases, such as $CO_2$ or $H_2S$ for example, encountered by the drilling fluid composition during drilling operations to prevent the gases from hydrolyzing components of the drilling fluid composition. Some example drilling fluid compositions may optionally include from 0.01 wt. % to 0.7 wt. % soda ash. In other embodiments, the drilling fluid composition may optionally include from 0.01 wt. % to 0.5 wt. %, from 0.01 wt. % to 0.3 wt. %, from 0.01 wt. % to 0.1 wt. %, from 0.01 wt. % to 0.05 wt. %, from 0.05 wt. % to 0.7 wt. %, from 0.05 wt. % to 0.5 wt. %, from 0.05 wt. % to 0.3 wt. %, from 0.05 wt. % to 0.1 wt. %, from 0.1 wt. % to 0.7 wt. %, from 0.1 wt. % to 0.5 wt. %, from 0.1 wt. % to 0.3 wt. %, from 0.3 wt. % to 0.7 wt. %, from 0.3 wt. % to 0.5 wt. %, or from 0.5 wt. % to 0.7 wt. % soda ash, based on the total weight of the drilling fluid composition. Some example drilling fluid compositions may optionally include from 0.1 lbm/bbl to 10 lbm/bbl soda ash, based on the total volume of the drilling fluid composition. In other embodiments, the drilling fluid composition may optionally include from 0.1 lbm/bbl to 8 lbm/bbl, from 0.1 lbm/bbl to 6 lbm/bbl, from 0.1 lbm/bbl to 4 lbm/bbl, from 1 lbm/bbl to 10 lbm/bbl, from 1 lbm/bbl to 8 lbm/bbl, from 1 lbm/bbl to 6 lbm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl soda ash, based on the total volume of the drilling fluid composition. Other example drilling fluid compositions may optionally include from 0.01 wt. % to 3 wt. % lime. In other embodiments, the drilling fluid composition may optionally include from 0.01 wt. % to 2 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 3 wt. %, from 0.05 wt. % to 2 wt. %, from 0.05 wt. % to 1 wt. %, from 0.05 wt. % to 0.5 wt. %, from 0.05 wt. % to 0.1 wt. %, from 0.1 wt. % to 3 wt. %, from 0.1 wt. % to 2 wt. %, from 0.1 wt. % to 1 wt. %, from 0.1 wt. % to 0.5 wt. %, from 0.5 wt. % to 3 wt. %, from 0.5 wt. % to 2 wt. %, from 0.5 wt. % to 1 wt. %, from 1 wt. % to 3 wt. %, from 1 wt. % to 2 wt. %, or from 2 wt. % to 3 wt. % lime, based on the total weight of the drilling fluid composition. In other examples, the drilling fluid compositions may optionally include from 0.1 lbm/bbl to 10 lbm/bbl lime, based on the total volume of the drilling fluid composition. In other embodiments, the drilling fluid composition may optionally include from 0.1 lbm/bbl to 8 lbm/bbl, from 0.1 lbm/bbl to 6 lbm/bbl, from 0.1 lbm/bbl to 4 lbm/bbl, from 1 lbm/bbl to 10 lbm/bbl, from 1 lbm/bbl to 8 lbm/bbl, from 1 lbm/bbl to 6 lbm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl lime, based on the total volume of the drilling fluid composition. In embodiments, the drilling fluid composition may have a pH of from 9.5 to 12, 9.5 to 11.5, from 9.5 to 11, from 9.5 to 10.5, from 9.5 to 10, from 10 to 12, from 10 to 11.5, from 10 to 11, from 10 to 10.5, from 10.5 to 12, from 10.5 to 11.5, from 10.5 to 11, from 11 to 12, from 11 to 11.5, or from 11.5 to 12. In some embodiments, the drilling fluid composition may have a pH of from 9.5 to 10.5.

In some embodiments, the drilling fluid composition may optionally include from 0.01 wt. % to 3 wt. % sodium sulfite. In other embodiments, the drilling fluid composition may optionally include from 0.01 wt. % to 2 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 3 wt. %, from 0.05 wt. % to 2 wt. %, from 0.05 wt. % to 1 wt. %, from 0.05 wt. % to 0.5 wt. %, from 0.05 wt. % to 0.1 wt. %, from 0.1 wt. % to 3 wt. %, from 0.1 wt. % to 2 wt. %, from 0.1 wt. % to 1 wt. %, from 0.1 wt. % to 0.5 wt. %, from 0.5 wt. % to 3 wt. %, from 0.5 wt. % to 2 wt. %, from 0.5 wt. % to 1 wt. %, from 1 wt. % to 3 wt. %, from 1 wt. % to 2 wt. %, or from 2 wt. % to 3 wt. % sodium sulfite, based on the total weight of the drilling fluid composition. In some embodiments, the drilling fluid composition may optionally include from 0.1 lbm/bbl to 10 lbm/bbl sodium sulfite, based on the total volume of the drilling fluid composition. In other embodiments, the drilling fluid composition may optionally include from 0.1 lbm/bbl to 8 lbm/bbl, from 0.1 lbm/bbl to 6 lbm/bbl, from 0.1 lbm/bbl to 4 lbm/bbl, from 1 lbm/bbl to 10 lbm/bbl, from 1 lbm/bbl to 8 lbm/bbl, from 1 lbm/bbl to 6 lbm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl sodium sulfite, based on the total volume of the drilling fluid composition. In some embodiments, the drilling fluid composition may optionally include from 0.1 wt. % to 1 wt. % starch. In other embodiments, the drilling fluid composition may optionally include from 0.1 wt. % to 0.8 wt. %, from 0.1 wt. % to 0.6 wt. %, from 0.1 wt. % to 0.4 wt. %, from 0.2 wt. % to 1 wt. %, from 0.2 wt. % to 0.8 wt. %, from 0.2 wt. % to 0.6 wt. %, from 0.2 wt. % to 0.4 wt. %, from 0.4 wt. % to 1 wt. %, from 0.4 wt. % to 0.8 wt. %, from 0.4 wt. % to 0.6 wt. %, from 0.6 wt. % to 1 wt. %, or from 0.6 wt. % to 0.8 wt. % starch, based on the total weight of the drilling fluid composition. In some embodiments, the drilling fluid composition may optionally include from 0.1 lbm/bbl to 10 lbm/bbl starch, based on the total volume of the drilling fluid composition. In other embodiments, the drilling fluid composition may optionally include from 0.1 lbm/bbl to 8 lbm/bbl, from 0.1 lbm/bbl to 6 lbm/bbl, from 0.1 lbm/bbl to 4 lbm/bbl, from 1 lbm/bbl to 10 lbm/bbl, from 1 lbm/bbl to 8 lbm/bbl, from 1 lbm/bbl to 6 lbm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl starch, based on the total volume of the drilling fluid composition.

The drilling fluid composition may have a density of from 70 pounds of mass per cubic foot ($lbm/ft^3$) to 160 $lbm/ft^3$, from 70 $lbm/ft^3$ to 150 $lbm/ft^3$, from 70 $lbm/ft^3$ to 140 $lbm/ft^3$, from 70 $lbm/ft^3$ to 130 $lbm/ft^3$, from 70 $lbm/ft^3$ to 120 $lbm/ft^3$, from 70 $lbm/ft^3$ to 110 $lbm/ft^3$, from 70 $lbm/ft^3$ to 90 $lbm/ft^3$, from 90 $lbm/ft^3$ to 160 $lbm/ft^3$, from 90 $lbm/ft^3$ to 150 $lbm/ft^3$, 90 $lbm/ft^3$ to 140 $lbm/ft^3$, from 90 $lbm/ft^3$ to 130 $lbm/ft^3$, from 90 $lbm/ft^3$ to 120 $lbm/ft^3$, from 90 $lbm/ft^3$ to 110 $lbm/ft^3$, from 110 $lbm/ft^3$ to 160 $lbm/ft^3$, from 110 $lbm/ft^3$ to 150 $lbm/ft^3$, from 110 $lbm/ft^3$ to 140 $lbm/ft^3$, from 110 $lbm/ft^3$ to 130 $lbm/ft^3$, from 110 $lbm/ft^3$ to 120 $lbm/ft^3$, from 120 $lbm/ft^3$ to 160 $lbm/ft^3$, from 120 $lbm/ft^3$ to 150 $lbm/ft^3$, or from 120 $lbm/ft^3$ to 140 $lbm/ft^3$, where 1 $lbm/ft^3$ is approximately 16.02 kilograms per cubic meter ($kg/m^3$). Some example drilling fluid compositions may have a density that is equal to or greater than 70 $lbm/ft^3$ (1,602 $kg/m^3$). Other example drilling fluid compositions may have a density that is equal to or greater than 100 $lbm/ft^3$ (1,602 $kg/m^3$). Still other example drilling fluid compositions may have a density that is equal to or greater than 120 $lbm/ft^3$ (1,922 kg/m$^3$). Still other example drilling fluid compositions may have a density of from 120 lbm/ft$^3$ (1,922 kg/m$^3$) to 160 lbm/ft$^3$ (2,563 kg/m$^3$).

In one or more embodiments, a drilling fluid composition comprises the base fluid, one or more additives including emulsifiers, weighting material, fluid-loss additives, viscosifiers, or alkali compounds, and from 0.1 wt. % to 1 wt. % of the ethoxylated alcohol compound having the chemical formula R—(OCH$_2$CH$_2$)$_7$—OH, where R is a saturated linear hydrocarbyl having from 8 to 20 carbon atoms. The drilling fluid composition may have a yield point of from 45 lbf/100 ft$^2$ to 100 lbf/100 ft$^2$ and a 10-second gel strength of from 1 lbf/100 ft$^2$ to 30 lbf/100 ft$^2$ as determined according to test methods provided in the American Petroleum Institute (API) Recommended Practice For Field Testing Water-Based Drilling Fluids (RP 13B-1/ISO 10414-1:2002) published August 2014 and incorporated by reference into this disclosure in its entirety. In some embodiments, the drilling fluid composition may include from 1 wt. % to 73 wt. % of a weighting material, from 0.1 wt. % to 1.0 wt. % soda ash, from 0.01 wt. % to 0.1 wt. % pre-hydrated bentonite, from 0.01 wt. % to 0.1 wt. % xanthan gum polymer, from 0.1 wt. % to 1.0 wt. % starch from 0.01 wt. % to 0.1 wt. % lime, and from 0.01 wt. % to 0.1 wt. % sodium sulfite. In some embodiments, the balance of the drilling fluid composition is the base fluid.

The ethoxylated alcohol compound produces a thinning effect when combined with the drilling fluid composition. As previously described, the thinning effect may result in a reduction in the gel strength of the drilling fluid composition, combined with maintenance of a yield point of the drilling fluid composition. The viscosity of the drilling fluid compositions may be measured using a standard oilfield viscometer, such as a FANN® Model 35 viscometer manufactured by Fann Instrument Company for example, according to test methods provided in the API Recommended Practice For Field Testing Water-Based Drilling Fluids (RP 13B-1/ISO 10414-1:2002). The viscosity is reported as shear stress in units of pounds of force per 100 square feet (lbf/100 ft$^2$). The viscometer may also be used to measure the shear rate of the drilling fluid compositions.

As previously stated, the ethoxylated alcohol compound reduces the gel strength of the drilling fluid compositions according to embodiments. The gel strength refers to the shear stress of the drilling fluid composition measured at a low shear rate following a defined period of time during which the drilling fluid composition is maintained in a static state. The shear stress of the drilling fluid composition at low shear rate may be measured using a standard oilfield viscometer, such as a FANN® Model 35 viscometer operated at low rpms, such as at 3 rpm or 6 rpm, according to the test methods described in API Recommended Practice For Field Testing Water-Based Drilling Fluids (RP 13B-1/ISO 10414-1:2002). To measure the gel strength, the drilling fluid composition is first stirred by contacting the drilling fluid composition with the spindle of the viscometer and operating the viscometer at 600 rotations per minute (rpm). The viscometer is then turned off for period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the drilling fluid composition comes to rest in a static state. Upon expiration of the time period, the viscometer is turned back on at a low speed, such as 3 rpm for example, to generate a low shear rate. The viscometer reading is then taken. The gel strength of the drilling fluid composition is reported in units of pounds of force per 100 square feet (lbf/100 ft$^2$).

The drilling fluid compositions that include the ethoxylated alcohol compound, may have a 10-second gel strength of less than or equal to 30 lbf/100 ft$^2$, less than or equal to 25 lbf/100 ft$^2$, or less than or equal to 20 lbf/100 ft$^2$. In some embodiments, the drilling fluid compositions having the ethoxylated alcohol compound may have a 10-second gel strength of from 1 lbf/100 ft$^2$ to 30 lbf/100 ft$^2$, from 1 lbf/100 ft$^2$ to 25 lbf/100 ft$^2$, from 1 lbf/100 ft$^2$ to 20 lbf/100 ft$^2$, from 1 lbf/100 ft$^2$ to 15 lbf/100 ft$^2$, from 5 lbf/100 ft$^2$ to 30 lbf/100 ft$^2$, from 5 lbf/100 ft$^2$ to 25 lbf/100 ft$^2$, from 5 lbf/100 ft$^2$ to 20 lbf/100 ft$^2$, from 5 lbf/100 ft$^2$ to 15 lbf/100 ft$^2$, from 10 lbf/100 ft$^2$, to 30 lbf/100 ft$^2$, from 10 lbf/100 ft$^2$ to 25 lbf/100 ft$^2$, from 10 lbf/100 ft$^2$ to 20 lbf/100 ft$^2$, from 10 lbf/100 ft$^2$ to 15 lbf/100 ft$^2$, or from 1 lbf/100 ft$^2$ to 10 lbf/100 ft$^2$. In one or more embodiments, the drilling fluid compositions having the ethoxylated alcohol compound may have a 10-second gel strength of from 5 lbf/100 ft$^2$ to 25 lbf/100 ft$^2$. Alternatively, in other embodiments, the drilling fluid compositions having the ethoxylated alcohol compound may have a 10-second gel strength of from 5 lbf/100 ft$^2$ to 20 lbf/100 ft$^2$. The 10-second gel strength of the drilling fluid composition having the ethoxylated alcohol compound may be compared to a 10-second gel strength of a comparative drilling fluid in which an equivalent weight of water is substituted for the ethoxylated alcohol compound. The 10-second gel strength of the drilling fluid composition having the ethoxylated alcohol compound may be less than or equal to 90% of the 10-second gel strength of the comparative drilling fluid, or less than or equal to 80% of the 10-second gel strength of the comparative drilling fluid, or less than or equal to 70% of the 10-second gel strength of the comparative drilling fluid.

The drilling fluid composition that includes the ethoxylated alcohol compound, may have a 10 minute gel strength of less than or equal to 60 lbf/100 ft$^2$, less than or equal to 55 lbf/100 ft$^2$, or less than or equal to 50 lbf/100 ft$^2$. In some embodiments, the drilling fluid composition having the ethoxylated alcohol compound may have a 10-second gel strength of from 10 lbf/100 ft$^2$ to 60 lbf/100 ft$^2$, from 10 lbf/100 ft$^2$ to 55 lbf/100 ft$^2$, from 10 lbf/100 ft$^2$ to 50 lbf/100 ft$^2$, from 10 lbf/100 ft$^2$ to 45 lbf/100 ft$^2$, from 20 lbf/100 ft$^2$ to 60 lbf/100 ft$^2$, from 20 lbf/100 ft$^2$ to 55 lbf/100 ft$^2$, from 20 lbf/100 ft$^2$ to 50 lbf/100 ft$^2$, from 20 lbf/100 ft$^2$ to 45 lbf/100 ft$^2$, from 30 lbf/100 ft$^2$ to 60 lbf/100 ft$^2$, from 30 lbf/100 ft$^2$ to 55 lbf/100 ft$^2$, from 30 lbf/100 ft$^2$ to 50 lbf/100 ft$^2$, from 30 lbf/100 ft$^2$ to 45 lbf/100 ft$^2$, or from 10 lbf/100 ft$^2$ to 40 lbf/100 ft$^2$. In one or more embodiments, the drilling fluid composition having the ethoxylated alcohol compound may have a 10-minute gel strength of from 10 lbf/100 ft$^2$ to 55 lbf/100 ft$^2$. Alternatively, in other embodiments, the drilling fluid composition having the ethoxylated alcohol compound may have a 10-minute gel strength of from 20 lbf/100 ft$^2$ to 50 lbf/100 ft$^2$.

The rheology of drilling fluid compositions that include the ethoxylated alcohol compound may be modeled based on Bingham plastic flow behavior. In particular, the drilling fluid composition having the ethoxylated alcohol compound behaves as a rigid body at low stress but flows as a viscous fluid at higher shear stress. The rheological behavior of the drilling fluid composition may be determined by measuring the shear stress on the drilling fluid composition at different shear rates, which may be accomplished by measuring the shear stress and/or shear rate on the drilling fluid composition using a FANN® Model 35 viscometer operated at 3 rpm, 6 rpm, 100 rpm, 200 rpm, 300 rpm, or 600 rpm, for example. The rheology of the drilling fluid composition may be evaluated from the plastic viscosity (PV) and the yield point (YP), which are parameters from the Bingham plastic rheology model. The PV is related to the resistance of the drilling fluid composition to flow due to mechanical interaction between the solids of the drilling fluid composition and represents the viscosity of the drilling fluid composition extrapolated to infinite shear rate. The PV reflects the type and concentration of the solids in the drilling fluid composition, and a lesser PV is preferred. The PV of the drilling fluid composition may be estimated by measuring the shear stress of the drilling fluid using a FANN® Model 35 viscometer at spindle speeds of 300 rotations per minute (rpm) and 600 rpm and subtracting the 300 rpm viscosity measurement from the 600 rpm viscosity measurement according to Equation 2, which is subsequently provided. The PV values determined for the drilling fluid compositions are provided in this disclosure in units of centipoise (cP).

$$PV=(\text{viscosity at}600 \text{ rpm})-(\text{viscosity at}300 \text{ rpm}) \quad \text{Equation 2}$$

The YP represents the shear stress below which the drilling fluid composition behaves as a rigid body and above which the drilling fluid composition flows as a viscous fluid. In other words, the YP represents the amount of stress required to move the drilling fluid composition from a static condition. The YP of a drilling fluid composition is correlated with the capacity of the drilling fluid composition to carry rock cuttings through the annulus, which in simplified terms indicates the drilling fluid composition's hole-cleaning ability. YP of equal to or greater than 15 lbf/100 ft$^2$ is considered acceptable for drilling. The YP is determined by extrapolating the Bingham plastic rheology model to a shear rate of zero. The YP of the drilling fluid composition may be estimated from the PV from Equation 2 by subtracting the PV from Equation 2 from the shear stress of the drilling fluid measured at 300 rpm according to Equation 3 provided subsequently.

$$YP=(300 \text{ rpm reading})-PV \quad \text{Equation 3}$$

The YP is expressed as a force per area, such as pounds of force per one hundred square feet (lbf/100 ft$^2$) for example. The methods for measuring and determining PV and YP for the drilling fluid compositions having the ethoxylated alcohol compound are consistent with methods conventionally used for drilling fluids in general.

The drilling fluid compositions having ethoxylated alcohol compounds may have a PV of from 45 cP to 100 cP, from 45 cP to 80 cP, from 45 cP to 70 cP, from 50 cP to 100 cP, from 50 cP to 80 cP, from 50 cP to 70 cP, from 55 cP to 100 cP, from 55 cP to 80 cP, or from 55 cP to 70 cP. In some embodiments, the drilling fluid composition having the ethoxylated alcohol compound may have a PV of from 45 cP to 80 cP. Alternatively, in some embodiments, the drilling fluid composition having the ethoxylated alcohol compound may have a PV of from 50 cP to 70 cP. The PV of the drilling fluid composition having the ethoxylated alcohol compound may be compared to a PV of a comparative drilling fluid in which an equivalent weight of water is substituted for the ethoxylated alcohol compound. A difference between the PV of the drilling fluid composition having the ethoxylated alcohol compound and the PV of the comparative drilling fluid may be equal to or less than 10% of the PV of the comparative drilling fluid.

The drilling fluid compositions having ethoxylated alcohol compounds as discussed previously in this disclosure may have a YP of from 45 lbf/100 ft$^2$ to 100 lbf/100 ft$^2$, from 45 lbf/100 ft$^2$ to 80 lbf/100 ft$^2$, from 45 lbf/100 ft$^2$ to 70 lbf/100 ft$^2$, from 50 lbf/100 ft$^2$ to 100 lbf/100 ft$^2$, from 50 lbf/100 ft$^2$ to 80 lbf/100 ft$^2$, from 50 lbf/100 ft$^2$ to 70 lbf/100 ft$^2$, from 55 lbf/100 ft$^2$ to 100 lbf/100 ft$^2$, from 55 lbf/100 ft$^2$ to 80 lbf/100 ft$^2$, or from 55 lbf/100 ft$^2$ to 70 lbf/100 ft$^2$. In some embodiments, the drilling fluid composition having the ethoxylated alcohol compound may have a YP of from 45 lbf/100 ft$^2$ to 80 lbf/100 ft$^2$. Alternatively, in some embodiments, the drilling fluid composition having the ethoxylated alcohol compound may have a YP of from 50 lbf/100 ft$^2$ to 70 lbf/100 ft$^2$. The YP of the drilling fluid composition having the ethoxylated alcohol compound may be compared to a YP of the comparative drilling fluid described above having the ethoxylated alcohol compound substituted by an equivalent weight of water. A difference between the YP of the drilling fluid composition having the ethoxylated alcohol compound and the YP of the comparative drilling fluid may be equal to or less than 25% of the PV of the comparative drilling fluid, or less than 20% of the PV of the comparative drilling fluid, or less than 15% of the PV of the comparative drilling fluid.

In one example, a drilling fluid composition comprising from 0.1 wt. % to 1 wt. % of the ethoxylated alcohol compound may have a YP of from 45 lbf/100 ft$^2$ to 100 lbf/100 ft$^2$ and a 10-second gel strength of from 1 lbf/100 ft$^2$ to 30 lbf/100 ft$^2$. In another example, a drilling fluid composition comprising the ethoxylated alcohol compound may have a YP of from 50 lbf/100 ft$^2$ to 80 lbf/100 ft$^2$ and a 10-second gel strength of from 5 lbf/100 ft$^2$ to 25 lbf/100 ft$^2$. In other examples, the drilling fluid composition having the ethoxylated alcohol compound may have a 10-second gel strength that is less than or equal to 10% of the 10-second gel strength of the comparative drilling fluid described above having the ethoxylated alcohol compound substituted by an equivalent weight of water, and a difference between the YP of the drilling fluid composition having the ethoxylated alcohol compound and the YP of the comparative drilling fluid may be less than or equal to 25% of the YP of the comparative drilling fluid.

The drilling fluid composition having the ethoxylated alcohol compound exhibits a deflocculant effect believed to be attributable to the presence of the ethoxylated alcohol compound. The deflocculant effect at least partially counteracts the thickening, excessive viscosity, and gelation of the drilling fluid composition that might occur due to interaction of the drilling fluid composition with the formation having swelling clay, excessive solids content, or both or due to extreme downhole temperatures. Specifically, the deflocculating effect exhibited by the drilling fluid composition having the ethoxylated alcohol compound works to decrease the gel strength and plastic viscosity of the drilling fluid composition while maintaining the yield point and the density of the drilling fluid composition. The decrease in gel strength and plastic viscosity of the drilling fluid composition caused by the deflocculant effect may result in a decrease in the pump pressure required to deliver the drilling fluid composition and prevention of gel formation in the drilling fluid composition. Improving pump-ability of the drilling fluid composition and, thus, reducing the pump pressure needed to circulate the drilling fluid composition into and out of the wellbore may reduce energy costs and result in a more efficient drilling fluid circulation process.

The drilling fluid composition having the ethoxylated alcohol compound may also decrease the probability of causing a differentially stuck pipe by minimizing solids settling in the drilling fluid composition. Maintaining the density and yield point of the drilling fluid composition with the ethoxylated alcohol compound maintains the supportive and hole-cleaning properties of the drilling fluid. In particular, maintaining the density may preserve the ability of the drilling fluid composition to support the wellbore and prevent fluids in the downhole formations from entering the wellbore. Maintaining the yield point of the drilling fluid composition maintains the ability of the drilling fluid composition to convey rock cuttings from the drilling zone to the top of the well-bore, which may preserve the hole-cleaning properties of the drilling fluid composition.

Additionally, the ethoxylated alcohol compound may facilitate the use of drilling fluid compositions having high density and solids content for drilling through highly pressurized formations, such as the Jilh formation in Saudi Arabia for example, and for controlling and killing formation fluids flowing into the wellbore during drilling operation. The drilling fluid composition having the ethoxylated alcohol compound may achieve the thinning effect without compromising other properties of the drilling fluid composition, such as density, hole-cleaning capabilities, and pumpability.

The ethoxylated alcohol compound may be used in methods for thinning a drilling fluid composition. In some embodiments, a method of thinning a drilling fluid includes adding an amount of an ethoxlylated alcohol compound to a drilling fluid to produce a drilling fluid composition having from 0.1 wt. % to 1 wt. % ethoxylated alcohol compound based on the total weight of the drilling fluid. The drilling fluid composition comprises a base fluid and at least one additive chosen from an emulsifier, a weighting material, a fluid-loss additive, a viscosifier, or an alkali compound. The ethoxylated alcohol compound is a compound having formula (I):

$$R\text{—}(OCH_2CH_2)_7\text{—}OH \quad (I)$$

where R is a saturated or unsaturated, linear or branched hydrocarbyl group having from 8 to 20 carbon atoms. In an example method, drilling fluid composition may include from 0.1 wt. % to 1 wt. % ethoxylated alcohol compound in embodiments, or from 0.1 wt. % to 0.8 wt. % ethoxylated alcohol compound in other embodiments, or from 0.2 wt. % to 0.6 wt. % ethoxylated alcohol compound in yet other embodiments. In some example methods for thinning a drilling fluid, the ethoxylated alcohol compound may be added to the drilling fluid to produce the drilling fluid composition having from 0.1 wt. % to 1 wt. % ethoxylated alcohol compound before using the drilling fluid composition in a drilling operation to drill a subterranean well.

The drilling fluid composition that includes the ethoxylated alcohol compound may be used for drilling a subterranean well. According to embodiments, a method of drilling a subterranean well may include operating a drill in a wellbore in the presence of a drilling fluid composition comprising a base fluid, at least one additive chosen from an emulsifier, a weighting material, a fluid-loss additive, a viscosifier, or an alkali compound, and from 0.1 wt. % to 1 wt. %, based on the total weight of the drilling fluid composition, of an ethoxylated alcohol compound having formula (I):

$$R\text{—}(OCH_2CH_2)_7\text{—}OH \quad (I)$$

where R is a saturated or unsaturated, linear or branched hydrocarbyl group having from 8 to 20 carbon atoms. In some embodiments, the drilling fluid composition has a yield point of from 45 lbf/100 ft² (21.6 Pa) to 100 lbf/100 ft² (48 Pa) and a 10-second gel strength of from 1 lbf/100 ft² (0.5 Pa) to 30 lbf/100 ft² (14.4 Pa) as determined according to test methods provided in API RP 13B-1 (American Petroleum Institute Recommended Procedure 13B-1). The base fluid may be an aqueous base fluid. In some example methods, the base fluid is an aqueous base fluid comprising at least 50 wt. % water. In some embodiments, the base fluid may be an oleaginous base fluid. In still other embodiments, the base fluid may be an invert emulsion fluid. In example methods, the drilling fluid composition further comprises at least one of xanthan gum polymer, soda ash, sodium sulfite, or starch.

The methods for drilling subterranean wells may include operating a drill in a wellbore in the presence of a drilling fluid composition comprising: a base fluid, a solid added to the base fluid, and from 0.1 wt. % to 1 wt. % of an ethoxylated alcohol compound (compound) having the formula R—(OCH₂CH₂)₇—OH, where R is a saturated or unsaturated, linear or branched hydrocarbyl group having from 8 to 20 carbon atoms. The drilling fluid composition has a density of greater than or equal to 100 pounds per cubic foot. The drilling fluid composition used for drilling the subterranean well may have a yield point of from 45 lbf/100 ft² to 100 lbf/100 ft² and a 10-second gel strength of from 1 lbf/100 ft² to 30 lbf/100 ft².

Another example method of drilling a subterranean well includes operating a drill in a wellbore and circulating a drilling fluid composition through the wellbore. The drilling fluid composition includes a solid added to a base liquid and has a density equal to or greater than 100 pounds per cubic foot. The method further includes adding an ethoxylated alcohol compound to the drilling fluid composition, the ethoxylated alcohol compound having the formula: R—(OCH₂CH₂)₇—OH, where R is a saturated or unsaturated, linear or branched hydrocarbyl group having from 8 to 20 carbon atoms. In some examples of the method of drilling a subterranean well, the ethoxylated alcohol compound may be added to the drilling fluid composition before operating the drill in the wellbore. In other examples of the method of drilling a subterranean well, the ethoxylated alcohol compound may be added to the drilling fluid composition during operation of the drill. The ethoxylated alcohol compound may be added to a drilling fluid composition as a stand-alone additive, meaning no other supplemental additives are included. For example, in some embodiments, the ethoxylated alcohol compound may consist essentially of the reaction product of the fatty alcohol of the ethylene oxide at a 1:7 molar ratio of the fatty alcohol to the ethylene oxide and may not contain any other additives.

EXAMPLES

The following examples illustrate one or more additional features of the present disclosure described previously. It should be understood that these examples are not intended to limit the scope of the disclosure or the appended claims in any manner.

In the following examples, water-based drilling fluids were prepared containing water, soda ash, pre-hydrated bentonite, xanthan gum polymer, starch, lime, sodium sulfite, and barite, with or without a thinner. The drilling fluids were formulated to have identical densities, accomplished in certain drilling fluids by slightly varying the amounts of water or barite present in the fluid. Thus, the identity of the thinner was the distinguishing characteristic used as a basis for comparing the drilling fluids of identical densities. The identities of the thinners used in the various water-based drilling fluids are summarized in Table 1. The physical characteristics of the water-based drilling fluids are described in Example 9 and are summarized in Tables 6 and 7.

TABLE 1

Reference Table of the Thinners Used in each Example

| Example | Thinner |
|---|---|
| 1 (Comparative) | None |
| 2 (Comparative) | SPARSENE ® drilling fluid thinner available from MI SWACO, a Schlumberger Company, Houston, Texas USA. |
| 3 | $C_{12}H_{25}(OCH_2CH_2)_7OH$ according to embodiments of this disclosure |
| 4 (Comparative) | $C_{10}H_{21}(OCH_2CH_2)_7OH$ |
| 5 (Comparative) | $C_{12}H_{25}(OCH_2CH_2)_1OH$ |
| 6 (Comparative) | $C_{13}H_{27}(OCH_2CH_2)_8OH$ |
| 7 (Comparative) | $C_{12}H_{25}(OCH_2CH_2)_9OH$ |
| 8 (Comparative) | $C_{13}H_{27}(OCH_2CH_2)_6OH$ |

Comparative Example 1

Water-Based Drilling Fluid with No Thinner

A water-based drilling fluid having high density and high solids content was formulated as a control sample for comparison with water-based drilling fluids containing various thinners. The water-based drilling fluid included water, soda ash, pre-hydrated bentonite, xanthan gum polymer, starch, lime, sodium sulfite, and barite in amounts provided subsequently in Table 2. The components of the water-based drilling fluid were added to a vessel and thoroughly mixed. The target density of the water-based drilling fluid formulation was 130 pounds (mass) per cubic foot ($lbm/ft^3$). The components of the water-based drilling fluid of Comparative Example 1 were added to a vessel and thoroughly mixed.

TABLE 2

Formulation for the Water-Based Drilling Fluid of Comparative Example 1

| Ingredient | Amount (lbm/bbl) | Weight Percent (wt. %) |
|---|---|---|
| Water | 229.4 | 31.47% |
| Soda Ash | 0.3 | 0.04% |
| Pre-Hydrated Bentonite | 5 | 0.69% |
| Xanthan Gum | 0.35 | 0.05% |
| Starch | 4 | 0.55% |
| Lime | 0.25 | 0.03% |
| Sodium Sulfite | 0.25 | 0.03% |
| Barite | 489.38 | 67.14% |
| Thinner | 0 | 0.00% |
| TOTAL | 728.93 | 100.00% |

Comparative Example 2

Water-Based Drilling Fluid with a Commercially Available Thinner

A water-based drilling fluid composition was formulated to include an amount of a commercially available thinner. The water-based drilling fluid composition was adjusted to compensate for the different density of the commercially available thinner so that the water-based drilling fluid of Comparative Example 2 had the same density as the water-based drilling fluid of Comparative Example 1. The commercially available thinner was SPERSENE® brand additive available from M-I SWACO, a Schlumberger company, Houston, Tex. The formulation for Comparative Example 2 is listed in Table 3 subsequently provided in this disclosure. The components of the water-based drilling fluid of Comparative Example 2, including the commercially available thinner, were added to a vessel and thoroughly mixed.

TABLE 3

Formulation for the Water-Based Drilling Fluid of Comparative Example 2 Including the Commercially Available Thinner

| Ingredient | Amount (lbm/bbl) | Weight Percent (wt. %) |
|---|---|---|
| Water | 227.3 | 31.18% |
| Soda Ash | 0.3 | 0.04% |
| Pre-Hydrated Bentonite | 5 | 0.69% |
| XC Polymer | 0.35 | 0.05% |
| Starch | 4 | 0.55% |
| Lime | 0.25 | 0.03% |
| Sodium Sulfite | 0.25 | 0.03% |
| Barite | 488.48 | 67.01% |
| Thinner | 3 | 0.41% |
| TOTAL | 728.93 | 100.00% |

Example 3

Water-Based Drilling Fluid Composition With $C_{12}H_{25}(OCH_2CH_2)_7OH$ Ethoxylated Alcohol Compound A water-based drilling fluid composition was prepared to include an amount of an ethoxylated alcohol compound according to embodiments of the present disclosure. The ethoxylated alcohol compound had the chemical formula $CH_3(CH_2)_{11}(OCH_2CH_2)_7OH$. The water-based drilling fluid composition of Example 3 was adjusted to compensate for the different density of the ethoxylated alcohol compound so that the water-based drilling fluid composition had the same density as the water-based drilling fluids of Comparative Examples 1 and 2. The components of the water-based drilling fluid composition of Example 3, including the ethoxylated alcohol compound, were added to a vessel and thoroughly mixed. The formulation for the water-based drilling fluid composition of Example 3 is listed in Table 4 subsequently provided.

TABLE 4

Formulation for the Water-Based Drilling Fluid Composition of Example 3 Having $C_{12}H_{25}(OCH_2CH_2)_7OH$ Ethoxylated Alcohol Compound

| Ingredient | Amount (lbm/bbl) | Weight Percent (wt. %) |
|---|---|---|
| Water | 226.36 | 31.05% |
| Soda Ash | 0.3 | 0.04% |
| Pre-Hydrated Bentonite | 5 | 0.69% |
| XC Polymer | 0.35 | 0.05% |
| Starch | 4 | 0.55% |
| Lime | 0.25 | 0.03% |

TABLE 4-continued

Formulation for the Water-Based Drilling Fluid Composition of Example 3 Having $C_{12}H_{25}(OCH_2CH_2)_7OH$ Ethoxylated Alcohol Compound

| Ingredient | Amount (lbm/bbl) | Weight Percent (wt. %) |
|---|---|---|
| Sodium Sulfite | 0.25 | 0.03% |
| Barite | 489.42 | 67.14% |
| Thinner | 3 | 0.41% |
| TOTAL | 728.93 | 100.00% |

Comparative Examples 4-8

Water-Based Drilling Fluids With Other Ethoxylated Alcohol Compounds

For comparison with the water-based drilling fluid composition of Example 3 having the ethoxylated fatty alcohol thinner $C_{12}H_{25}(OCH_2CH_2)_7OH$, five alternative water-based drilling fluid compositions having the alternative ethoxylated alcohols listed in Table 1 were prepared. Each of the water-based drilling fluid compositions of Comparative Examples 4-8 was prepared to include a different alternative ethoxylated alcohol compound. Each of the water-based drilling fluid compositions of Comparative Examples 4-8 exhibited the same density as the water-based drilling fluid compositions of Comparative Examples 1, Comparative Example 2, and Example 3. For each formulation of the water-based drilling fluid compositions of Comparative Examples 4-8, the components of the water-based drilling fluid composition were added to a vessel and thoroughly mixed. The water-based drilling fluid compositions of Comparative Examples 4-8 along with the water-based drilling fluid composition of Example 3 are listed in Table 5 subsequently provided. Table 5 also includes the total amount of each of the water-based drilling fluid compositions were prepared.

Example 9

Characterizations of Water-Based Drilling Fluid Compositions

The water-based drilling fluid compositions of Comparative Example 1, Comparative Example 2, and Example 3 were evaluated for viscosity, gel strength, PV, YP, pH, and density according to the methods previously described in this disclosure. The results of these evaluations for the water-based drilling fluid compositions of Comparative Example 1, Comparative Example 2, and Example 3 are provided subsequently in Table 6. Table 6 also includes a calculated change in the 10-second gel strength, 10-minute gel strength, PV, and YP of the water-based drilling fluid compositions of Comparative Example 2 and Example 3 compared to the water-based drilling fluid composition of Comparative Example 1.

TABLE 6

Evaluation of the Properties of the Water-Based Drilling Fluid Compositions of Comparative Example 1, Comparative Example 2, and Example 3

| | Example 1 (comparative) | Example 2 (comparative) | Example 3 |
|---|---|---|---|
| Thinner | None | SPERSENE ® | $C_{12}H_{25}(OCH_2CH_2)_7OH$ |
| Shear Stress at 600 rpm (lbf/100 ft²) | 189 | 165 | 177 |
| Shear Stress at 300 rpm (lbf/100 ft²) | 126 | 102 | 116 |
| Shear Stress at 200 rpm (lbf/100 ft²) | 102 | 77.5 | 92 |
| Shear Stress at 100 rpm (lbf/100 ft²) | 73 | 49.5 | 65 |

TABLE 5

Water-Based Drilling Fluid Formulations for Comparative Examples 4-8 and Example 3

| Ingredient | Ex. 3 lbm/bbl (wt. %) | Ex. 4 (comparative) lbm/bbl (wt. %) | Ex. 5 (comparative) lbm/bbl (wt. %) | Ex. 6 (comparative) lbm/bbl (wt. %) | Ex. 7 (comparative) lbm/bbl (wt. %) | Ex. 8 (comparative) lbm/bbl (wt. %) |
|---|---|---|---|---|---|---|
| Water | 226.36 (31.05%) | 226.36 (31.05%) | 226.36 (31.05%) | 226.36 (31.05%) | 226.36 (31.05%) | 226.36 (31.05%) |
| Soda Ash | 0.3 (0.04%) | 0.3 (0.04%) | 0.3 (0.04%) | 0.3 (0.04%) | 0.3 (0.04%) | 0.3 (0.04%) |
| Pre-Hydrated Bentonite | 5 (0.69%) | 5 (0.69%) | 5 (0.69%) | 5 (0.69%) | 5 (0.69%) | 5 (0.69%) |
| XC Polymer | 0.35 (0.05%) | 0.35 (0.05%) | 0.35 (0.05%) | 0.35 (0.05%) | 0.35 (0.05%) | 0.35 (0.05%) |
| Starch | 4 (0.55%) | 4 (0.55%) | 4 (0.55%) | 4 (0.55%) | 4 (0.55%) | 4 (0.55%) |
| Lime | 0.25 (0.03%) | 0.25 (0.03%) | 0.25 (0.03%) | 0.25 (0.03%) | 0.25 (0.03%) | 0.25 (0.03%) |
| Sodium Sulfite | 0.25 (0.03%) | 0.25 (0.03%) | 0.25 (0.03%) | 0.25 (0.03%) | 0.25 (0.03%) | 0.25 (0.03%) |
| Barite | 489.42 (67.14%) | 489.42 (67.14%) | 489.42 (67.14%) | 489.42 (67.14%) | 489.42 (67.14%) | 489.42 (67.14%) |
| Thinner | 3 (0.41%) | 3 (0.41%) | 3 (0.41%) | 3 (0.41%) | 3 (0.41%) | 3 (0.41%) |
| TOTAL | 728.93 (100.00%) | 728.93 (100.00%) | 728.93 (100.00%) | 728.93 (100.00%) | 728.93 (100.00%) | 728.93 (100.00%) |

TABLE 6-continued

Evaluation of the Properties of the Water-Based Drilling Fluid Compositions of Comparative Example 1, Comparative Example 2, and Example 3

| | Example 1 (comparative) | Example 2 (comparative) | Example 3 |
|---|---|---|---|
| Shear Stress at 6 rpm (lbf/100 ft$^2$) | 40 | 14.5 | 26 |
| Shear Stress at 3 rpm (lbf/100 ft$^2$) | 39 | 10.5 | 23 |
| 10-second Gel Strength (lbf/100 ft$^2$) | 36 | 9.5 | 12 |
| 10-Minute Gel Strength (lbf/100 ft$^2$) | 75 | 38 | 42 |
| PV (cP) | 63 | 63 | 61 |
| YP (lbf/100 ft$^2$) | 63 | 39 | 55 |
| pH | 10.57 | 9.76 | 9.8 |
| Change in 10-second Gel Strength (%) | — | −74 | −67 |
| Change in 10-Minute Gel Strength (%) | — | −49 | −44 |
| Change in PV (%) | — | 0 | −3 |
| Change in YP (%) | — | −38 | −13 |

As shown in Table 6, inclusion of the commercially available thinner in the drilling fluid of Comparative Example 2 resulted in a 74% reduction in the 10-second gel strength of the drilling fluid and a 49% reduction in the 10 minute gel strength of the drilling fluid compared to the drilling fluid composition of Comparative Example 1. The PV of the drilling fluid composition of Comparative Example 2 was the same as the PV of the drilling fluid composition of Comparative Example 1; however, the drilling fluid composition of Comparative Example 2 exhibited a 38% reduction in the YP compared to the drilling fluid composition of Comparative Example 1. Although the drilling fluid composition having the commercially available thinner of Comparative Example 2 exhibited a reduced gel strength compared to the drilling fluid composition of Comparative Example 1, the drilling fluid composition having the commercially available thinner showed a significant reduction of 38% in the YP, which substantially reduces the ability of the drilling fluid composition of Comparative Example 2 to capture and convey rock cuttings to the surface.

As shown in Table 6, the drilling fluid composition of Example 3, which included the ethoxylated alcohol compound $C_{12}H_{25}(OCH_2CH_2)_7OH$, resulted in a 67% reduction in the 10-second gel strength and a 44% reduction in the 10-minute gel strength of the drilling fluid compared to the drilling fluid composition of Comparative Example 1. The reduction in gel strength achieved by the drilling fluid composition having the ethoxylated alcohol compound of Example 3 was slightly less than, but comparable to, the drilling fluid having the commercially available thinner of Comparable Example 2. The drilling fluid composition having the ethoxylated alcohol compound of Example 3 exhibited a slight 3% reduction in the PV of the drilling fluid compared to the drilling fluids of Comparative Example 1 and Comparative Example 2. The drilling fluid composition having the ethoxylated alcohol compound of Example 3 showed only a 13% reduction in YP of the drilling fluid composition of Example 3 compared to the drilling fluid composition of Comparative Example 1.

The purpose of incorporating the ethoxylated alcohol compound of Example 3 or the commercially available thinner of Comparative Example 2 is to reduce the plastic viscosity and gel strength of the drilling fluid composition. The drilling fluid compositions having the ethoxylated alcohol compound of Example 3 performed equivalent to the drilling fluids having the commercially available thinner of Comparative Example 2 with respect to reduced PV and gel strength. The deflocculant or thinning effect of the drilling fluid composition having the ethoxylated alcohol compound of Example 3, therefore, is equivalent to that of the drilling fluid composition having the commercially available thinner of Comparative Example 2 as shown by the similar effect on PV and gel strength.

However, the drilling fluid composition having the ethoxylated alcohol compound of Example 3 better maintains the YP of the drilling fluid composition compared to the drilling fluid having the commercially available thinner of Comparative Example 2. The drilling fluid having the commercially available thinner of Comparative Example 2 exhibited in a 38% reduction in the YP of the water-based drilling fluid of Comparative Example 2 compared with the water-based drilling fluid of Comparative Example 1, which had no thinner. In contrast, the drilling fluid composition having the ethoxylated alcohol compound of Example 3 exhibited only a 13% reduction in the YP of the water-based drilling fluid composition of Example 3 compared to the water-based drilling fluid of Comparative Example 1, which had no thinner. The YP relates to the ability of the drilling fluid composition to convey rock cuttings to the surface and, thus, the hole-cleaning properties of the drilling fluid composition. The drilling fluid composition having the ethoxylated alcohol compound of Example 3 resulted in less of a reduction in the YP of the drilling fluid composition compared to the drilling fluids having the commercially available thinner of Comparative Example 2. Thus, the drilling fluid composition having the ethoxylated alcohol compound of Example 3 outperformed the drilling fluid composition having the commercially available thinner of Comparative Example 2 with respect to maintaining the YP of drilling fluid composition, and consequently maintaining the ability of the drilling fluid composition to capture and convey rock cuttings to the surface of the wellbore (hole-cleaning ability).

To summarize, the PV and gel strength performance of the drilling fluid compositions having the ethoxylated alcohol compound of Example 3 provides equivalent reduction in gel strength and enhanced pump-ability of the water-based drilling fluid composition compared to the drilling fluid having the commercially available thinner of Comparative Example 2, and the superior YP performance of the drilling fluid composition having the ethoxylated alcohol compound of Example 3 compared to the drilling fluid having the commercially available thinner of Comparative Example 2 preserves the hole-cleaning properties of the water-based drilling fluid composition. Therefore, the presence of the ethoxylated alcohol compound in the drilling fluid composition, as in Example 3, reduces the gel strength of and enhances the pump-ability of the drilling fluid composition without jeopardizing the hole-cleaning properties of the drilling fluid composition.

The water-based drilling fluid compositions of Comparative Examples 4-8 were also evaluated for viscosity, gel strength, PV, YP, pH, and density according to the methods previously described in this disclosure. The results of these evaluations for the water-based drilling fluid compositions of Comparative Examples 4-8, as well as the results for Comparative Example 1 and Example 3, are provided subsequently in Table 7. Table 7 also includes a calculated change in the 10-second gel strength, 10-minute gel strength, PV, and YP of the water-based drilling fluid compositions of Comparative Examples 4-8 and Example 3 compared to the water-based drilling fluid composition of Comparative Example 1.

include a thinner. However, these reductions in gel strength for Comparative Examples 6-8 relative to Comparative Example 1 were significantly less than the reduction in gel strength of the drilling fluid composition of Example 3 relative to Comparative Example 1. Out of Comparative Examples 6-8, the best performing drilling fluid composition was Comparative Example 6, which exhibited a 14% reduction in the 10-second gel strength and a 17% reduction in the 10-minute gel strength compared to the drilling fluid composition of Comparative Example 1. As previously described, the drilling fluid composition including the ethoxylated alcohol compound of Example 3 resulted in greater reductions in the gel strength of the drilling fluid

TABLE 7

Evaluation of the Properties of the Water-Based Drilling Fluid Compositions of Comparative Example 1, Example 3, and Comparative Examples 4-8

| | Ex. 1 comparative | Ex. 3 | Ex. 4 comparative | Ex. 5 comparative | Ex. 6 comparative | Ex. 7 comparative | Ex. 8 comparative |
|---|---|---|---|---|---|---|---|
| Shear Stress at 600 rpm (lbf/100 ft$^2$) | 189 | 177 | 192 | 250 | 180 | 188 | 167 |
| Shear Stress at 300 rpm (lbf/100 ft$^2$) | 126 | 116 | 130 | 193 | 125 | 127 | 115 |
| Shear Stress at 200 rpm (lbf/100 ft$^2$) | 102 | 92 | 105 | 170 | 103 | 102 | 95 |
| Shear Stress at 100 rpm (lbf/100 ft$^2$) | 73 | 65 | 74 | 139 | 76 | 72 | 71 |
| Shear Stress at 6 rpm (lbf/100 ft$^2$) | 40 | 26 | 46 | 105 | 33 | 42 | 36 |
| Shear Stress at 3 rpm (lbf/100 ft$^2$) | 39 | 23 | 42 | 101 | 30 | 40 | 34 |
| 10-second Gel Strength (lbf/100 ft$^2$) | 36 | 12 | 40 | 96 | 31 | 35 | 33 |
| 10-Minute Gel Strength (lbf/100 ft$^2$) | 75 | 42 | 85 | 127 | 62 | 56 | 76 |
| PV (cP) | 63 | 61 | 62 | 57 | 55 | 61 | 61 |
| YP (lbf/100 ft$^2$) | 63 | 55 | 68 | 136 | 70 | 66 | 66 |
| pH | 10.57 | 9.8 | 9.7 | 9.7 | 9.9 | 9.9 | 12.1 |
| Change in 10-second Gel Strength (%) | — | −67% | 11% | 167% | −14% | −3% | −8% |
| Change in 10-Minute Gel Strength (%) | — | −44% | 13% | 69% | −17% | −25% | 1% |
| Change in PV (%) | — | −3% | −2% | −10% | −13% | −3% | −3% |
| Change in YP (%) | — | −13% | 8% | 116% | 11% | 5% | 5% |

As shown in Table 7, drilling fluid compositions of Comparative Examples 6-8 exhibited reductions in the gel strength of the drilling fluid composition compared to the drilling fluid of Comparative Example 1, which did not composition (67% reduction in 10-second gel strength and a 44% reduction in the 10-minute gel strength compared to the drilling fluid composition of Comparative Example 1) as compared to the drilling fluid compositions of Comparative Examples 4-8. For Comparative Examples 4 and 5, the 10-second gel strength and the 10-minute gel strength of the drilling fluid compositions actually increased compared to the drilling fluid composition of Comparative Example 1, which did not contain a thinner.

A first aspect of the present disclosure may be directed to a drilling fluid composition comprising a base fluid; at least one additive chosen from an emulsifier, a weighting material, a fluid-loss additive, a viscosifier, or an alkali compound; and from 0.1 wt. % to 1 wt. %, based on the total weight of the drilling fluid composition, of an ethoxylated alcohol compound having formula (I):

$$R\text{—}(OCH_2CH_2)_7\text{—}OH \quad (I)$$

where R is a hydrocarbyl group having from 8 to 20 carbon atoms.

A second aspect of the present disclosure may include the first aspect, where the drilling fluid composition has a yield point of from 45 lbf/100 ft$^2$ to 100 lbf/100 ft$^2$ and a 10-second gel strength of from 1 lbf/100 ft$^2$ to 30 lbf/100 ft$^2$ as determined according to test methods provided in API RP 13B-1.

A third aspect of the present disclosure may include the first and second aspects, in which the base fluid is an aqueous base fluid.

A fourth aspect of the present disclosure may include the third aspect, in which the aqueous base fluid comprises at least 50 weight percent water based on the total weight of the aqueous base fluid.

A fifth aspect of the present disclosure may include the third and second aspects, in which the aqueous base fluid is chosen from fresh water, filtered water, distilled water, sea water, salt water, produced water, formation brine, or combinations thereof.

A sixth aspect of the present disclosure may include the first through fifth aspects, in which R is a saturated linear hydrocarbyl group.

A seventh aspect of the present disclosure may include the first through sixth aspects, in which R is —(CH$_2$)$_m$CH$_3$, where m is 11, 12, or 13.

An eighth aspect of the present disclosure may include the first through sixth aspects, in which R has exactly 12 carbon atoms.

A ninth aspect of the present disclosure may include the first through eighth aspects, in which the drilling fluid composition has a density of equal to or greater than 70 lbm/ft$^3$.

A tenth aspect of the present disclosure may include the first through ninth aspects, in which the at least one additive comprises a weighting material.

An eleventh aspect of the present disclosure may include the tenth aspect, in which the weighting material is chosen from at least one of barite, calcium carbonate, hematite, siderite, or ilmenite.

A twelfth aspect of the present disclosure may include the tenth and eleventh aspects comprising from 1 wt. % to 73 wt. % weighting material, based on the total weight of the drilling fluid composition.

A thirteenth aspect of the present disclosure may include the first through twelfth aspects comprising from 20 wt. % to 50 wt. % base fluid, based on the total weight of the drilling fluid composition.

A fourteenth aspect of the present disclosure may include the first through thirteenth aspects further comprising from 0.01 wt. % to 0.7 wt. % xanthan gum polymer based on the total weight of the drilling fluid composition.

A fifteenth aspect of the present disclosure may include the first through fourteenth aspects further comprising from 0.01 wt. % to 0.7 wt. % soda ash based on the total weight of the drilling fluid composition.

A sixteenth aspect of the present disclosure may include the first through fifteenth aspects further comprising from 0.01 wt. % to 3.0 wt. % sodium sulfite based on the total weight of the drilling fluid composition.

A seventeenth aspect of the present disclosure may include the first through sixteenth aspects further comprising from 0.1 wt. % to 1 wt. % starch based on the total weight of the drilling fluid composition.

An eighteenth aspect of the present disclosure may include the first through seventeenth aspects, in which the at least one additive comprises a weighting material, and in which the drilling fluid composition comprises, based on the total weight of the drilling fluid composition: from 1 wt. % to 73 wt. % weighting material, from 0.01 wt. % to 0.7 wt. % soda ash, from 0.01 wt. % to 3 wt. % pre-hydrated bentonite, from 0.01 wt. % to 0.7 wt. % xanthan gum polymer, from 0.1 wt. % to 1.0 wt. % starch, from 0.01 wt. % to 3 wt. % lime, and from 0.01 wt. % to 3 wt. % sodium sulfite.

A nineteenth aspect of the present disclosure may be directed to a method of drilling a subterranean well, the method comprising operating a drill in a wellbore in the presence of a drilling fluid composition comprising: a base fluid; at least one additive chosen from an emulsifier, a weighting material, a fluid-loss additive, a viscosifier, or an alkali compound; and from 0.1 wt. % to 1 wt. %, based on the total weight of the drilling fluid composition, of an ethoxylated alcohol compound having formula (I):

$$R\text{—}(OCH_2CH_2)_7\text{—}OH \quad (I)$$

where R is a hydrocarbyl group having from 8 to 20 carbon atoms.

A twentieth aspect of the present disclosure may include the nineteenth aspect, in which the drilling fluid composition has a yield point of from 45 lbf/100 ft$^2$ to 100 lbf/100 ft$^2$ and a 10-second gel strength of from 1 lbf/100 ft$^2$ to 30 lbf/100 ft$^2$ as determined according to test methods provided in API RP 13B-1.

A twenty-first aspect of the present disclosure may include the nineteenth and the twentieth aspects, in which the base fluid is an aqueous base fluid.

A twenty-second aspect of the present disclosure may include the twenty-first aspect, in which the aqueous base fluid comprises at least 50 weight percent water based on the total weight of the aqueous base fluid.

A twenty-third aspect of the present disclosure may include the twenty-first and twenty-second aspects, in which the aqueous base fluid is chosen from fresh water, filtered water, distilled water, sea water, salt water, produced water, formation brine, or combinations thereof.

A twenty-fourth aspect of the present disclosure may include the ninteenth through twenty-third aspects, in which R is a saturated linear hydrocarbyl group.

A twenty-fifth aspect of the present disclosure may include the ninteenth through twenty-fourth aspects, in which R is —(CH$_2$)$_m$CH$_3$, where m is 11, 12, or 13.

A twenty-sixth aspect of the present disclosure may include the ninteenth through twenty-fourth aspects, in which R has exactly 12 carbon atoms.

A twenty-seventh aspect of the present disclosure may include the ninteenth through twenty-sixth aspects, in which the drilling fluid composition has a density of equal to or greater than 70 lbm/ft$^3$.

A twenty-eighth aspect of the present disclosure may include the ninteenth through twenty-seventh aspects, in which the one or more additives comprise a weighting material.

A twenty-ninth aspect of the present disclosure may include the twenty-eighth aspect, in which the weighting material comprises at least one of barite, calcium carbonate, hematite, siderite, or ilmenite.

A thirtieth aspect of the present disclosure may include the twenty-eighth and twenty-ninth aspects, in which the drilling fluid composition comprises from 1 wt. % to 73 wt. % weighting material based on the total weight of the drilling fluid composition.

A thirty-first aspect of the present disclosure may include the nineteenth through thirtieth aspects, in which the drilling fluid composition comprises from 20 wt. % to 50 wt. % base fluid, based on the total weight of the drilling fluid composition.

A thirty-second aspect of the present disclosure may include the nineteenth through thirty-first aspects, in which the drilling fluid composition further comprises at least one of a xanthan gum polymer, soda ash, sodium sulfite, or starch.

A thirty-third aspect of the present disclosure may include the nineteenth through thirty-second aspects, further comprising adding the compound having formula (I) to the drilling fluid composition before or during operating the drill in the wellbore.

A thirty-fourth aspect of the present disclosure may include the nineteenth through thirty-third aspects, in which the compound having formula (I) is added to the drilling fluid composition during operation of the drill in the wellbore.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A drilling fluid composition consisting essentially of:
   a base fluid;
   at least one additive chosen from an emulsifier, a weighting material, a fluid-loss additive, a viscosifier, or an alkali compound; and
   from 0.1 wt. % to 1 wt. %, based on the total weight of the drilling fluid composition, of an ethoxylated alcohol compound having formula (I):

$$R\text{—}(OCH_2CH_2)_7\text{—}OH \qquad (I)$$

where R is a hydrocarbyl group having exactly 12 carbon atoms; in which
   the drilling fluid composition has a density equal to or greater than 90 lbm/ft$^3$;
   the drilling fluid composition has a yield point of from 45 lbf/100 ft$^2$ to 100 lbf/100 ft$^2$; and
   the drilling fluid composition has a 10-second gel strength of from 1 lbf/100 ft$^2$ to 30 lbf/100 ft$^2$ as determined according to test methods provided in API RP 13B-1.

2. The drilling fluid composition of claim 1, in which the base fluid is an aqueous base fluid.

3. The drilling fluid composition of claim 2, in which the aqueous base fluid comprises at least 50 weight percent water based on the total weight of the aqueous base fluid.

4. The drilling fluid composition of claim 2, in which the aqueous base fluid is chosen from fresh water, filtered water, distilled water, sea water, salt water, produced water, formation brine, or combinations thereof.

5. The drilling fluid composition of claim 1, in which R is a saturated linear hydrocarbyl group.

6. The drilling fluid composition of claim 1, in which R is —(CH$_2$)$_m$CH$_3$, where m is 11.

7. The drilling fluid composition of claim 1, in which the at least one additive comprises a weighting material.

8. The drilling fluid composition of claim 7, in which the weighting material is chosen from at least one of barite, calcium carbonate, hematite, siderite, or ilmenite.

9. The drilling fluid composition of claim 7 comprising from 1 wt. % to 73 wt. % weighting material, based on the total weight of the drilling fluid composition.

10. The drilling fluid composition of claim 1 comprising from 20 wt. % to 50 wt. % base fluid, based on the total weight of the drilling fluid composition.

11. The drilling fluid composition of claim 1 further comprising from 0.01 wt. % to 0.7 wt. % xanthan gum polymer based on the total weight of the drilling fluid composition.

12. The drilling fluid composition of claim 1 further comprising from 0.01 wt. % to 0.7 wt. % soda ash based on the total weight of the drilling fluid composition.

13. The drilling fluid composition of claim 1, in which the at least one additive consists essentially of a weighting material, and in which the drilling fluid composition comprises, based on the total weight of the drilling fluid composition:

from 1 wt. % to 73 wt. % weighting material;
from 0.01 wt. % to 0.7 wt. % soda ash;
from 0.01 wt. % to 3 wt. % pre-hydrated bentonite;
from 0.01 wt. % to 0.7 wt. % xanthan gum polymer;
from 0.1 wt. % to 1.0 wt. % starch;
from 0.01 wt. % to 3 wt. % lime; and
from 0.01 wt. % to 3 wt. % sodium sulfite.

* * * * *